United States Patent

(12) United States Patent
Ito

(10) Patent No.: US 9,658,764 B2
(45) Date of Patent: May 23, 2017

(54) INFORMATION PROCESSING APPARATUS AND CONTROL METHOD THEREOF

(71) Applicant: CANON KABUSHIKI KAISHA, Tokyo (JP)

(72) Inventor: Hikaru Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 366 days.

(21) Appl. No.: 13/944,206

(22) Filed: Jul. 17, 2013

(65) Prior Publication Data

US 2014/0022194 A1   Jan. 23, 2014

(30) Foreign Application Priority Data

Jul. 20, 2012  (JP) ................................. 2012-161542

(51) Int. Cl.
*G06F 3/0488* (2013.01)
*G06F 3/041* (2006.01)

(52) U.S. Cl.
CPC .......... *G06F 3/04883* (2013.01); *G06F 3/041* (2013.01); *G06F 3/0416* (2013.01); *G06F 3/0488* (2013.01); *G06F 2203/04104* (2013.01); *G06F 2203/04808* (2013.01)

(58) Field of Classification Search
CPC . G06F 3/01; G06F 3/011; G06F 3/017; G06F 3/048–3/04897; G06F 2203/04104; G06F 2203/04106
See application file for complete search history.

(56) References Cited

U.S. PATENT DOCUMENTS

| 2005/0110769 A1 | 5/2005 | DaCosta et al. |
| 2010/0162181 A1* | 6/2010 | Shiplacoff et al. ............ 715/863 |
| 2012/0019452 A1* | 1/2012 | Westerman ......... G06F 3/04883 345/173 |
| 2012/0169670 A1 | 7/2012 | Kim et al. |

FOREIGN PATENT DOCUMENTS

| CN | 101349944 A | 1/2009 |
| CN | 101458610 A | 6/2009 |
| CN | 101957707 A | 1/2011 |
| CN | 102224488 A | 10/2011 |
| JP | 2005524914 A | 8/2005 |
| JP | 2011-227854 A | 11/2011 |
| JP | 2012-113730 A | 6/2012 |
| WO | 2012/087939 A1 | 6/2012 |

* cited by examiner

*Primary Examiner* — David Tung
(74) *Attorney, Agent, or Firm* — Canon U.S.A., Inc. IP Division

(57) ABSTRACT

An information processing apparatus detects a touched point where an operation screen has been touched, and when the number of touched points detected has decreased to one point, recognize an input based on one detected touched point as a single-touch operation by using a condition different from that when the number of touched points has increased to one point from a state in which a touched point is not detected.

20 Claims, 12 Drawing Sheets

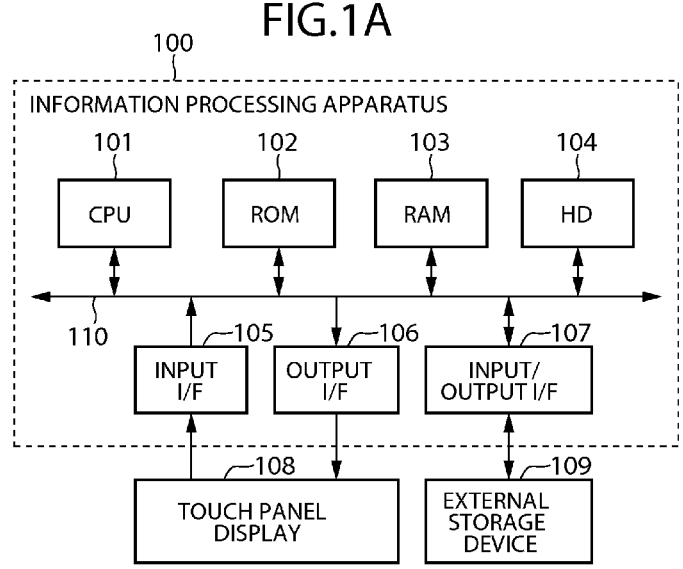
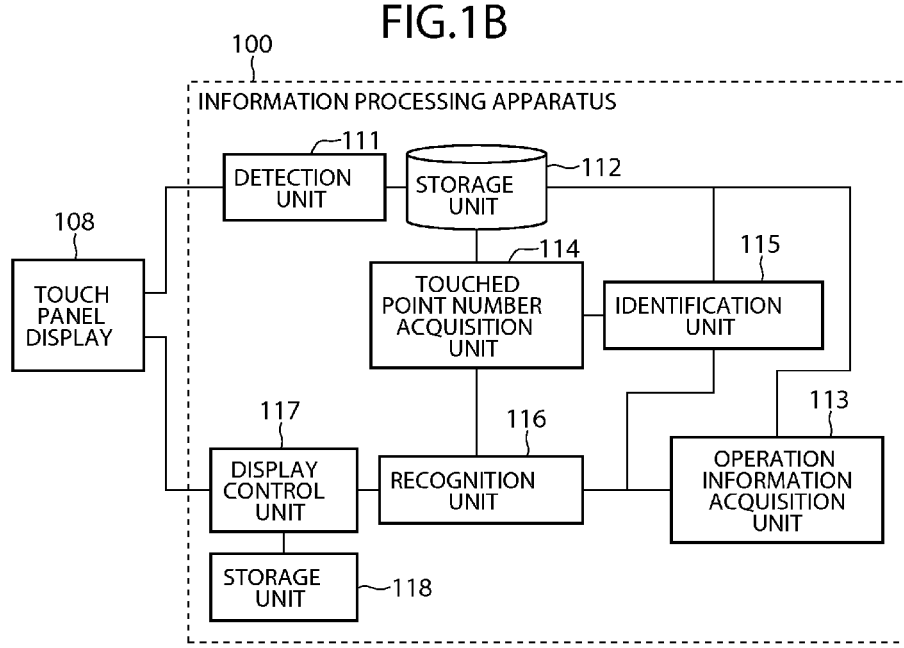

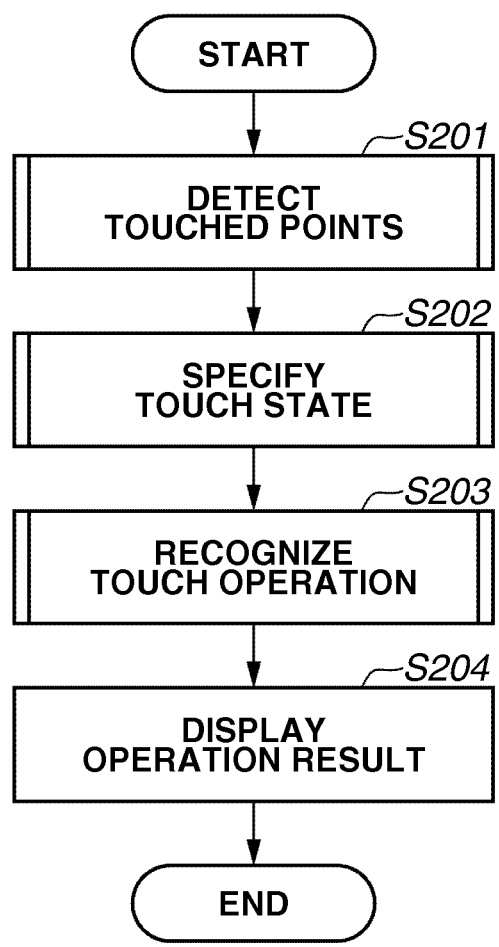

INFORMATION PROCESSING APPARATUS AND CONTROL METHOD THEREOF

BACKGROUND OF THE INVENTION

Field of the Invention

The present invention relates to a technology for recognizing a touch operation.

Description of the Related Art

Recently, technology that detects a plurality of points on a screen which has been touched, and executes an operation corresponding to the movement of those touched points has been developed. Such an operation that is performed based on touching of a plurality of points is known as a multi-touch operation.

In Japanese Patent Application Laid-Open No. 2011-227854, a scroll operation of a screen is performed by a drag operation in which two fingers in contact with the screen are moved in one direction without changing the distance between them. The scroll amount of the screen based on this operation is set to be twice that when a drag operation is performed with one finger. Specifically, the user can change the scroll amount by changing the number of touched points.

As in Japanese Patent Application Laid-Open No. 2011-227854, in an apparatus capable of performing a multi-touch operation, the operation content can change depending on whether one point was touched or two points were touched, for example.

However, the user may not always simultaneously bring the plurality of fingers into contact with the screen, or simultaneously release the fingers that were in contact with the screen. For example, even though the user may have intended to perform a two point touch, the user may actually touch one point first, and then touch the next point.

Further, recently touch panels have been used that detect and recognize the approach of a finger as a touch even without the finger actually coming into contact with the screen, a touched point on the apparatus may be detected even though the user intended to release his/her hand from the screen. Thus, immediately after the number of detected touched points has changed, there is both the possibility that the touched point is detected despite the fact that the user has already finished the operation, and the possibility that the user has intentionally changed the number of touching fingers in order to consecutively perform a plurality of operations.

SUMMARY OF THE INVENTION

The present invention is directed to, in an apparatus capable of a multi-touch operation, reducing malfunctions that can occur when the number of detected touched points has changed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 1A and 1B illustrate a hardware and a function configuration of an information processing apparatus.

FIG. 2 is a flowchart illustrating an example of a main processing flow in an information processing apparatus.

DESCRIPTION OF THE EMBODIMENTS

Figure 3:
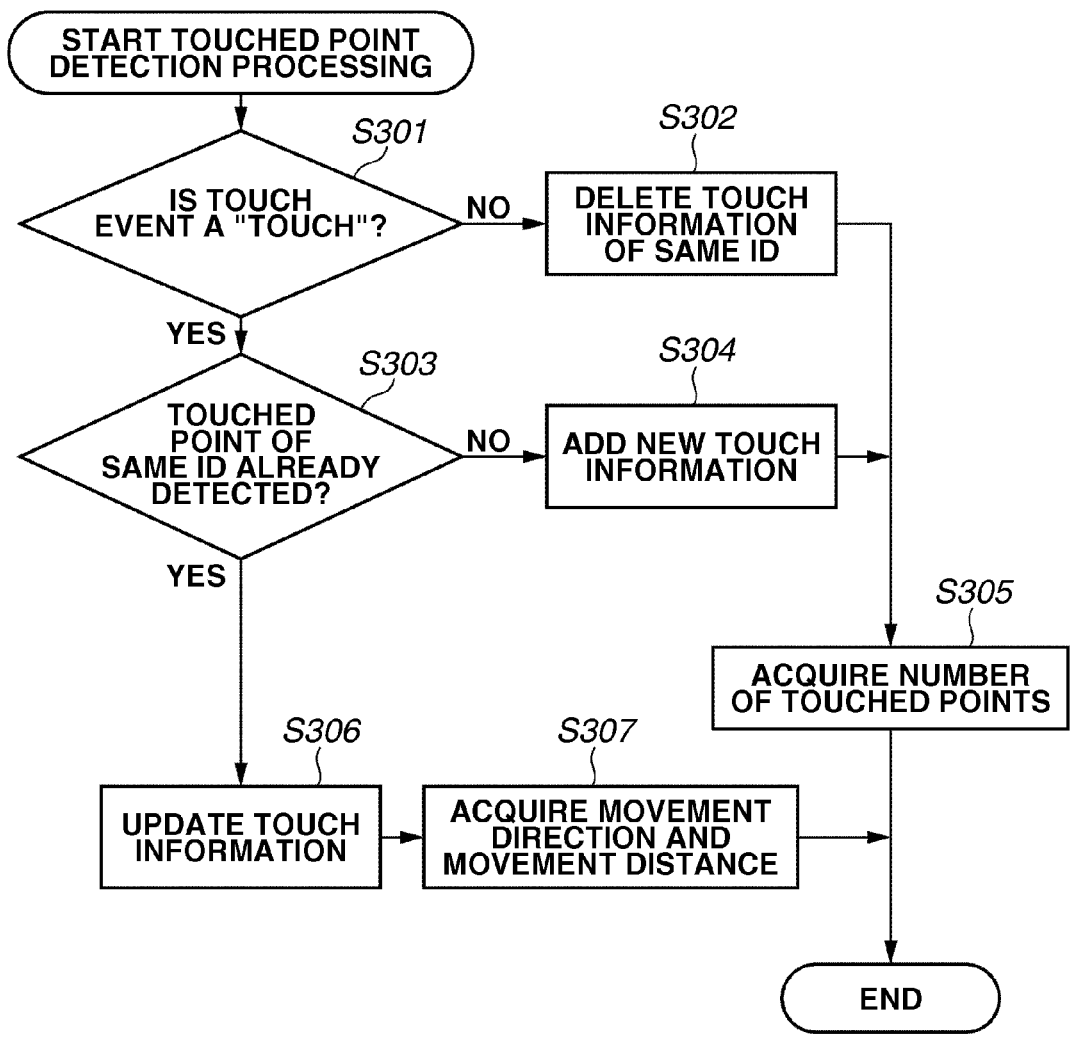
FIG. 3 is a flowchart illustrating an example of a touched point detection processing flow executed by an information processing apparatus.

Various exemplary embodiments, features, and aspects of the invention will be described in detail below with reference to the drawings.

The exemplary embodiment described below illustrates an example in which the present exemplary embodiment is specifically implemented. However, the present invention is not limited to this.

A shift in the number of touched points detected when a multi-touch operation is performed in a typical information processing apparatus will now be described. When the information processing apparatus recognizes a touch operation performed by the user touching an operation face on a touch panel display 108, the information processing apparatus sequentially acquires information about each touched point notified from the touch panel, and recognizes the number, the position, and the moved trajectory of the touched points as a touch operation instruction. When a multi-touch operation of two touched points starts, first, the number of touched points detected at the operation face changes from zero points to one point, then from one point to two points, and the operation is performed in a state in which two points are detected. Conversely, after the operation, the number of touched points detected at the operation face changes from two points to one point, and then from one point to zero points. For a user who is trying to perform a multi-touch operation, if the apparatus recognizes an operation performed while one point is touched during the shift from zero points to two points as a single touch operation, an operation that is not expected by the user is executed. Examples of the multi-touch operations include, but are not limited to, a multi-drag operation in which two touched points are moved in parallel while maintaining the interval between them fixed, a pinch operation in which the distance between a plurality of touched points is changed, and a rotate operation in which a plurality of touched points are rotated.

In a first exemplary embodiment, when N-number of touched points are detected, the information processing apparatus identifies whether the detected N-number of touched points is an increase or a decrease from the previous number of touched points. Then, based on the identified result, the information processing apparatus recognizes the touch operation instruction according to the N-number of touched points.

As a basic example in which a multi-touch operation can be performed, an example will now be described in which the information processing apparatus recognizes an operation instruction based on one or two touched points. The multi-touch operation in this example refers to a case in which two points are touched. In the present exemplary embodiment, the upper limit of the touched points used in an operation is two points. Specifically, even if the user touches three or more points, two points are detected as the operation target touched points based on a predetermined standard (e.g., selecting the first detected two points, or two points close to the center of the screen etc.).

In the present exemplary embodiment, an example will be described in which an operation is performed on a displayed screen based on a touch operation in which the user moves his/her fingers on the touch panel display 108.

FIG. 1A illustrates an example of a hardware configuration of an information processing apparatus 100 according to the present exemplary embodiment. A central processing unit (CPU) 101 performs calculations and logic determinations for various processes, and controls the various constituent elements that are connected to a system bus 110. This information processing apparatus 100 includes a memory, such as a program memory and a data memory. A read-only memory (ROM) 102, which is a program memory, stores programs for controls performed by the CPU, including the various processing procedures that are described below. A random-access memory (RAM) 103 includes a work area for the above-described programs of the CPU 101, a save area for data during error processing, and a load area for the above-described control programs. A program memory can also be realized by loading a program into the RAM 103 from an external storage device 109, for example. A hard disk (HD) 104 stores the data and programs relating to the present exemplary embodiment. In the present exemplary embodiment, a plurality of image data is stored in the HD 104. An external storage device 109 that fulfils the same function and that is connected via an input/output interface 107 may also be used. This external storage device 109 can be realized by, for example, a medium (a program storage medium) and an external storage drive for realizing access to that medium. Examples of this medium include a flexible disk (FD), a compact disc-ROM (CD-ROM), a digital versatile disc (DVD), a universal serial bus (USB) memory, a magneto optical disc (MO), a flash memory and the like. Further, the external storage device 109 may be a server apparatus connected via a network. The information that is necessary in the present exemplary embodiment is stored in the RAM 103, the HD 104, and the external storage device 109. An input interface 105 acquires signals output from an input device, such as a pointing device. An output interface 106 outputs signals that control the output of the results of various below-described processing to an output device that includes a display unit, such as a liquid crystal display or a television monitor. In the present exemplary embodiment, a touch panel display 108 that is integrated with the information processing apparatus 100 is used for the touch panel that serves as an input device and the display device that serves as an output device. However, an external device connected to the information processing apparatus 100 may also be employed. The touch panel display 108 serving as the input device used in the present exemplary embodiment is an electrostatic capacitance type. Further, in the present exemplary embodiment, the touch panel display 108 can be operated in two modes, a normal mode and a high-sensitivity mode. In the normal mode, a touch sensor provided on the operation face for detecting touches by the user is scanned, and points contacted by the user, or points from which contact was released, are successively notified to the information processing apparatus 100 as a touch event each time such a point is detected. In contrast, in the high-sensitivity mode, the sensitivity of the touch sensor is increased, so that an approaching finger is detected as a touched point even if the finger is not in contact with the touch panel display 108 surface. However, the type of touch panel is not limited to an electrostatic capacitance type. For example, contact with or an approach to the operation face by the user can also be detected using a device that employs electromagnetic induction or an optical sensor.

FIG. 1B is a function block diagram illustrating a function configuration of the information processing apparatus 100 according to the present exemplary embodiment.

The information processing apparatus 100 according to the present exemplary embodiment includes a detection unit 111, an operation information acquisition unit 113, a touched point number acquisition unit 114, a identification unit 115, a recognition unit 116, and a display control unit 117. Each of these function units is realized by the CPU 101 extracting and executing a program stored in the ROM 102. Further, a storage unit 112 included in the information processing apparatus 100 according to the present exemplary embodiment is a function unit of the RAM 103, and a storage unit 118 is a function unit of the HD 104. However, the present invention can be similarly realized even by an information processing apparatus that realizes these function units with hardware. Each element will now be described in more detail.

The detection unit 111 detects the touched points touched by the user, by receiving and analyzing touch event information notified from the touch panel display 108. In the present exemplary embodiment, a touch event indicates that the user has touched the touch panel display 108 or has released his/her touch. The touch event information also includes position information indicating the position of a touched point on the operation screen of the touch panel display 108 on which a touch event has occurred, and the time (detection time) at which the touch event was detected. The detection unit 111 associates coordinate information representing the position of a touched point and the detection time with an ID of the touched point, and stores this information in the storage unit 112 for each touched point. Utilizing an ID enables identical touched points to be differentiated. In the present exemplary embodiment, the order in which the touched points were detected is made to correspond to the ID. Specifically, the touched point that is detected first is assigned and managed with the ID 1, and the touched point that is detected second is assigned and managed with the ID 2.

The operation information acquisition unit 113 acquires operation information indicating a movement distance and movement direction of touched points provided with the same ID, the distance between a plurality of touched points, and the amount of change in that distance, based on the touched point position information stored in the storage unit 112.

The touched point number acquisition unit 114 acquires the number of detected touched points. In the present exemplary embodiment, the number of touched points can be acquired by referring to the number of touched point IDs that are stored in the storage unit 112.

The identification unit 115 identifies the state of the touched point at that time. In the present exemplary embodiment, the identification unit 115 identifies whether the state of the touched point when the newest touch event was detected, is a "no touch state", a "multi-touch state", a "single-touch state", a "2 to 1 transition state", or a "0 to 1 transition state". Further, the identification unit 115 stores information indicating the identified state.

In the present exemplary embodiment, the "no touch state" indicates a state in which no touched points are detected. Further, the "2 to 1 transition state" indicates a state in which the number of detected touched points has decreased from two to one. The "0 to 1 transition state" indicates a state that has changed from a state in which no touched points were detected to a state in which the number of detected touched points has increased to one. The "single-touch state" indicates a state in which a single touch operation is recognized based on the detected one touched point. In the "2 to 1 transition state" and the "0 to 1 transition state", when the respective different transition conditions are satisfied, the state transitions to the "single-touch state". Thus, in the present exemplary embodiment, when the number of detected touched points is one, the identification unit 115 identifies whether the number of detected touched points is the result of an increase by one point from a previous state or a decrease by one point from the previous state. Based on the identification result, the operation is recognized as a single-touch operation. The "multi-touch state" indicates a state in which two touched points have been detected, so that a multi-touch operation is recognized.

The recognition unit 116 recognizes the identification result of the identification unit 115 and the operation information about the touched points input from the touch panel display 108 to the information processing apparatus 100 as a touch operation instruction performed by the user. In the present exemplary embodiment, the recognition unit 116 determines whether the operation information acquired by the operation information acquisition unit 113 satisfies a pre-stored condition for recognizing a touch operation instruction. If it is determined that the recognition condition is satisfied, the recognition unit 116 recognizes the operation information as an instruction for the relevant touch operation. At this stage, the recognizable operations are different for each touch state. In the present exemplary embodiment, if it has been identified that the current touch state is any of "no touch state", "2 to 1 transition state", or "0 to 1 transition state", the recognition unit 116 does not recognize the operation command. However, if it is identified that the current touch state is "multi-touch state", the recognition unit 116 compares the acquired operation information with the pre-stored recognition condition for each of a plurality of multi-touch operations, and recognizes the operation that is the closet match, as a multi-touch operation instruction. Further, if it is identified that the current touch state is "single-touch state", the recognition unit 116 compares the acquired operation information with the pre-stored recognition condition for a single-touch operation, and recognizes the operation that is the closest match, as a single-touch operation instruction.

The display control unit 117 generates and outputs a display image to be displayed on the touch panel display 108 serving as an output apparatus. The image displayed on the touch panel display 108 is, for example, one among a plurality of image data sorted in order of creation date and time. However, the sorting order is not limited to this. The display control unit 117 controls the image displayed on the touch panel display 108 based on the touch operation recognized by the recognition unit 116.

The storage unit 112 stores information processed by the detection unit 111, the operation information acquisition unit 113, the touched point number acquisition unit 114, and the identification unit 115.

The storage unit 118 stores a plurality of image data that can be displayed and viewed on the touch panel display 108. In the present exemplary embodiment, these image data are stored in order of their created date and time.

In the present exemplary embodiment, before the touch operation is performed by a user, at least one among the plurality of image data stored in the storage unit 118 is displayed on the touch panel display 108. When the user moves one touched point on the touch panel display 108, the image displayed at that time follows the movement of the touched point. Further, if the touched point is moved a predetermined distance or more in the horizontal direction, the image stored before or after the image being displayed, is displayed. On the other hand, if the user simultaneously moves two touched points in the horizontal direction on the touch panel display 108 without changing the distance between them, the image stored ten images before or ten images after the image displayed at that time is displayed. For example, when the user touches the touch panel display 108 with two fingers, and moves those touched points to the right, the image that is stored ten images before the displayed image is displayed. In the following, an operation for displaying the image ten images before or after, performed by the user touching the touch panel display 108 with two fingers and horizontally moving the two touched points without changing the distance between them will be referred to as a multi-drag operation, as differentiated from a move operation, in which the display image is moved with one finger. Therefore, when a move operation is recognized by the recognition unit 116 based on the movement of the touched points, the display control unit 117 generates a display image for displaying the display data stored before or after the image being displayed, from among the plurality of image data stored in the storage unit 118. Further, when a multi-drag operation is recognized by the recognition unit 116 based on the movement direction of the two touched points, the display control unit 117 generates a display image for displaying the display data stored ten images before or after the image being displayed, from among the plurality of image data stored in the storage unit 118. Still further, when a pinch operation is recognized by the recognition unit 116 based on the amount of change in the distance between the two touched points, the display control unit 117 generates a display image that is increased or reduced in size from the image being displayed before the user performs the operation. In addition, display control is executed based on the single-touch operation or the multi-touch operation recognized by the recognition unit 116.

FIG. 2 is a flowchart illustrating a main processing flow executed by the information processing apparatus 100. In the present exemplary embodiment, the processing performed in the flowchart illustrated in FIG. 2 is started when at least one piece of image data stored in the storage unit 118 is displayed.

First, in step S201, the detection unit 111 detects a touched point. The detection unit 111 analyzes a touch event notified from the touch panel display 108, acquires the ID, the position coordinates, the detection time, the movement distance, and the movement direction, of the touched point, and stores the acquired information in the storage unit 112.

In step S202, the identification unit 115 identifies the touch state of the information processing apparatus 100. In the present exemplary embodiment, based on the acquired touched point information, the identification unit 115 identifies whether the touch state at that time is a "no touch state", a "multi-touch state", a "single-touch state", a "2 to 1 transition state", or a "0 to 1 transition state".

In step S203, the recognition unit 116 recognizes the touch operation. The recognition unit 116 recognizes the touch state identified in step S202 and the operation information such as the position and movement amount of the touched point detected in step S201 as a touch operation instruction.

In step S204, the display control unit 117 generates a display image for displaying the operation result of the touch operation recognized by the recognition unit 116, and outputs the generated display image to the touch panel display 108.

Next, the processing executed in each of steps S201 to S204 will be described in more detail with reference to a flowchart.

FIG. 3 is a flowchart illustrating the touched point detection processing flow executed in step S201.

First, in step S301, the detection unit 111 determines whether the touch event notified from the touch panel display 108 is "TOUCH". When the touch panel display 108 used in the present exemplary embodiment detects that a touch has been made, the touch panel display 108 notifies "TOUCH" as the touch event, and when the touch panel display 108 detects that a detected touch has been released, the touch panel display 108 notifies "RELEASE" as the touch event. If it is determined that the notified touch event is "TOUCH" (YES in step S301), the processing proceeds to step S303. If it is determined that the notified touch event is not "TOUCH", i.e., is "RELEASE", (NO in step S301), the processing proceeds to step S302. The touch panel display 108 scans from the edges the touch sensors (not illustrated) that are arranged in a lattice across an operation face 901. If there is a touch sensor that detected a touch, the touch panel display 108 issues a touch event notification. Therefore, even when a plurality of points is touched, the touch events are notified one by one.

In step S302, the detection unit 111 deletes the ID along with the information associated with the ID corresponding to the touched point as to which "RELEASE" is detected, from among the information stored in the storage unit 112.

On the other hand, in step S303, the detection unit 111 determines whether a touched point having the same ID as the touched point as to which "TOUCH" is detected has already been detected. The detection unit 111 determines whether a corresponding ID is included in the storage unit 112 by referring to the information stored in the storage unit 112. If it is determined that a touched point having the same ID has already been detected (YES in step S303), the processing proceeds to step S306. If it is determined that a touched point having the same ID has not been detected (NO in step S303), the processing proceeds to step S304.

In step S304, the detection unit 111 adds new information about the ID, the coordinates, and the detection date and time of the touched point as to which "TOUCH" is detected, to the information stored in the storage unit 112. Then, the detection unit 111 calculates the number of touched points from the number of IDs, and stores this information.

In step S305, the touched point number acquisition unit 114 acquires the number of IDs of touched points as the number of touched points that are detected at that time, by referring to the information stored in the storage unit 112, and stores this information in the storage unit 112. At this stage, if the number of touched points is different from the previous processing, information indicating the time at which the number of touched points changed is stored along with the previous number of touched points. The previous number of touched points is stored as the number of touched points before the change of the number occurs. If information relating to the previous number of touched points is already stored, this information is updated to information relating to the newest change. The information relating to the previous number of touched points that is stored in the storage unit 112 will be referred to hereinafter as the touched point number change history.

In step S306, the detection unit 111 updates the information stored in the storage unit 112 by adding to the information stored in the storage unit 112 information about the newest coordinates and detection date and time, with respect to the same ID as the touched point as to which "TOUCH" is detected. Consequently, in the present exemplary embodiment, the coordinates and the detection date and time of the touched point having the same ID are accumulated until a "RELEASE" event is detected and the touch information is deleted in step S302.

Further, if the number of touched points is two or more, the distance between the touched points and changes in the distance are acquired. Similarly, the acquired information about the distance between the touched points is also associated with the ID of the relevant touched points, and stored in the storage unit 112. Consequently, in the present exemplary embodiment, each time touched points associated with an ID move, information indicating the distance between the touched points and changes in the distance is accumulated until a "RELEASE" event is detected and the information relating to the touched points is deleted in step S302.

In step S307, the operation information acquisition unit 113 acquires the movement direction and the movement distance of the touched point. First, to acquire the movement direction, based on position information of the previous touched point obtained from the information stored in the storage unit 112, the operation information acquisition unit 113 generates a movement vector that heads toward the position of the touched point detected this time. Then, the operation information acquisition unit 113 determines the angle between this generated movement vector and a predetermined reference axis, and sets the determined angle as the movement direction. For example, if the reference axis is the Y axis of the operation face 901 in the below-described operation examples, then the up direction is 0°, the down direction is 180°, the right direction is 90°, and the left direction is 270°.

Next, to acquire the movement distance, the distance between the position of a reference point and the position of the touched point as to which "TOUCH" is detected is determined. In the present exemplary embodiment, the reference point is a point where this touched point is first touched. Subsequently, the reference point is changed to the position of the touched point which was updated the previous time. The position of the touched point is updated when the number of touched points changes, when a move is recognized, or when a multi-drag is recognized. The position of the touched point as previously updated is indicated by the coordinates corresponding to the second newest detection date and time, from among the information that is stored in the storage unit 112 at that time. The operation information acquisition unit 113 associates the information about the movement direction and the movement distance thus acquired regarding the touched point as to which "TOUCH" is detected, with the ID of the relevant touched point, and stores in the storage unit 112. Consequently, in the present exemplary embodiment, each time the touched point having the same ID moves, information indicating the movement direction and the movement distance is accumulated until a "RELEASE" event is detected and the information relating to the touched point is deleted in step S302.

Figure 4:
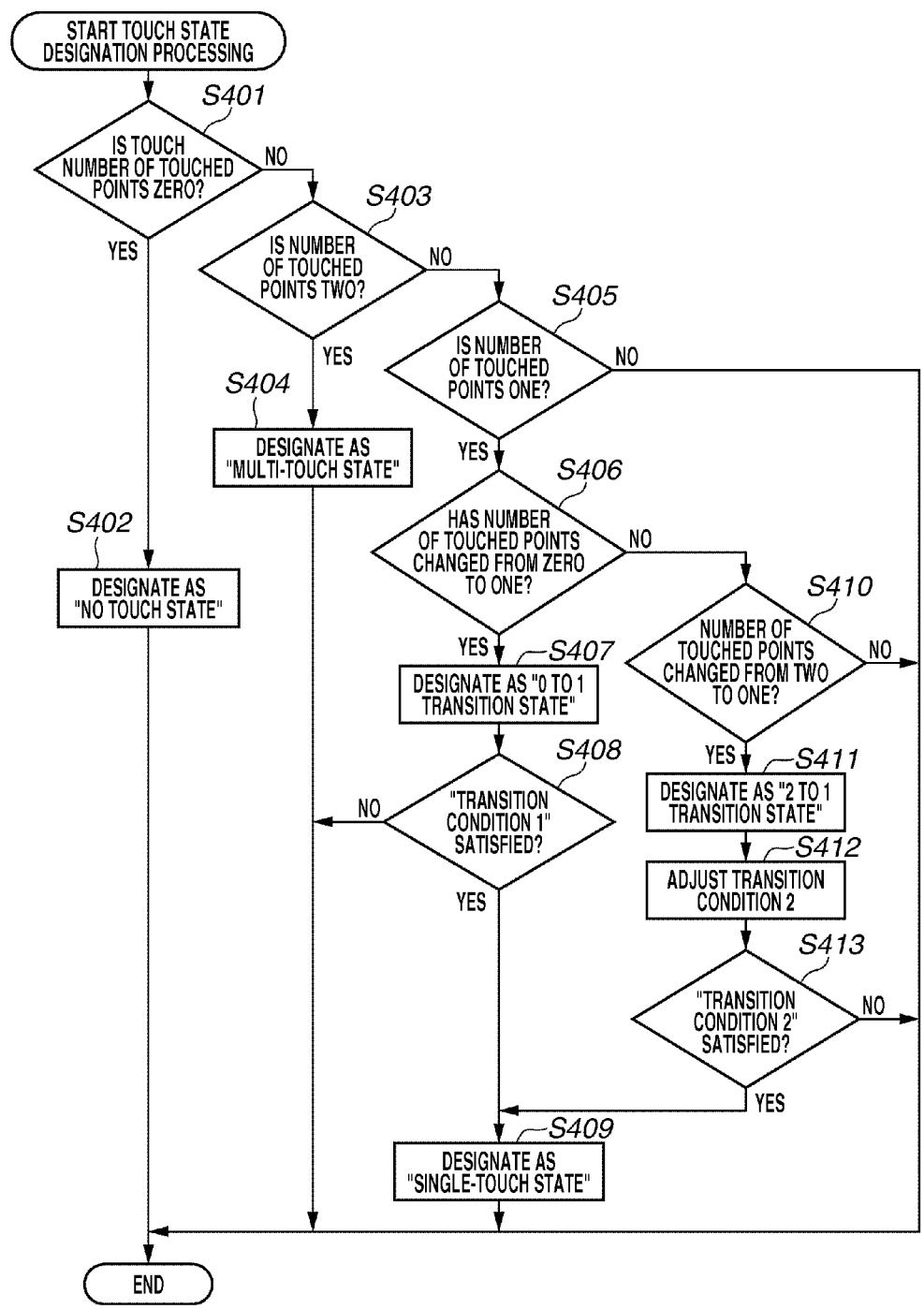
FIG. 4 is a flowchart illustrating an example of a processing flow for identifying a touch state executed by an information processing apparatus.

Next, FIG. 4 is a flowchart illustrating a touch state identification processing flow in the information processing apparatus 100 executed in step S202.

First, in step S401, the touched point number acquisition unit 114 determines whether the number of touched points detected by the touch panel display 108 is zero. In the present exemplary embodiment, the touched point number acquisition unit 114 determines whether the number of touched points is zero by referring to the information stored in the storage unit 112 in step S305. If it is determined that the number of touched points is zero (YES in step S401), the processing proceeds to step S402. If it is determined that the number of touched points is not zero (NO in step S401), the processing proceeds to step S403.

In step S402, the identification unit 115 identifies the touch state of the information processing apparatus 100 as a "no touch state", and stores information indicating "no touch state".

In step S403, the touched point number acquisition unit 114 determines whether the number of touched points detected by the touch panel is two by referring to the stored number of touched points. In the present exemplary embodiment, the touched point number acquisition unit 114 determines whether the number of touched points is two by referring to the information about the number of touched points stored in the storage unit 112 in step S305. If it is determined that the number of touched points is two (YES in step S403), the processing proceeds to step S404. If it is determined that the number of touched points is not two (NO in step S403), the processing proceeds to step S405.

In step S404, the identification unit 115 identifies the touch state of the information processing apparatus 100 as a "multi-touch state", and stores information indicating "multi-touch state".

In step S405, the touched point number acquisition unit 114 determines whether the number of touched points detected by the touch panel display 108 is one. In the present exemplary embodiment, the touched point number acquisition unit 114 determines whether the number of touched points is one by referring to the information about the number of touched points stored in the storage unit 112 in step S305. If it is determined that the number of touched points is one (YES in step S405), the processing proceeds to step S406. If it is determined that the number of touched points is not one (NO in step S405), the processing is finished.

In step S406, the identification unit 115 determines whether the touched points detected on the touch panel display 108 has increased from the previous state and changed from zero to one touched point. In the present exemplary embodiment, the touched point number acquisition unit 114 determines whether the number of touched points is zero before the number has changed to one, by referring to the touched point number change history stored in the storage unit 112 in step S305. If it is determined that the number of touched points has changed from zero to one (YES in step S406), the processing proceeds to step S407. If it is determined that the number of touched points has not changed from zero to one (NO in step S406), the processing proceeds to step S410.

In step S407, the identification unit 115 identifies the touch state of the information processing apparatus 100 as a "0 to 1 transition state", and stores information indicating "0 to 1 transition state".

Then, in step S408, the identification unit 115 determines whether the state of the detected touched point satisfies "transition condition 1". The identification unit 115 refers to the detection date and time and the coordinates of the touched point that are stored in the storage unit 112, and determines whether these pieces of information satisfy "transition condition 1". "Transition condition 1" is a condition for determining whether the information processing apparatus 100 in the "0 to 1 transition state" should recognize a single-touch operation based on one detected touched point. If the touched point state does satisfy "transition condition 1", in the present exemplary embodiment, it is considered that the user is trying to perform an operation with one touched point.

Three conditions will now be described as an example of "transition condition 1".

The first condition is that the length of time that has elapsed since the number of touched points changed from zero to one is equal to or more than a threshold A. This threshold A is a length of time. Therefore, the identification unit 115 calculates elapsed time up to the detection date and time at which the current touch event "TOUCH" is detected in step S301, by referring to information stored in step S305 about the time at which the number of touched points changed. If the identification unit 115 determines that the calculated elapsed time is equal to or more than the predetermined threshold A, transition condition 1 is determined to be satisfied. Threshold A may be, for example, 0.3 seconds.

The second condition is that the movement distance of the touched point since the number of touched points changed from zero to one is equal to or more than a threshold B. This threshold B is a distance amount. Therefore, the identification unit 115 calculates the movement distance from the position of the touched point at the time when the number of touched points changed to the newest detected position of the touched point having the same ID. If the identification unit 115 determines that the calculated movement distance is equal to or more than the predetermined threshold B, transition condition 1 is determined to be satisfied. Threshold B may be, for example, 20 dots.

The third condition is that the number of times that a single-touch operation has been recognized since the number of touched points changed from zero to one, is equal to or more than a threshold C. This threshold C is a number of times. In the present exemplary embodiment, in the processing of the below-described step S409, a count is made each time a single-touch state is detected. Therefore, the identification unit 115 determines whether the number of times that a single-touch operation has been recognized since the detected number of touched points changed from zero to one, is equal to or more than the predetermined threshold C, and if it is determined that the number of times is equal to or more than the threshold C, the identification unit 115 determines that transition condition 1 is satisfied. Threshold C may be, for example, two times.

If it is determined in step S408 that any one of the above-described three conditions is satisfied, the identification unit 115 determines that "transition condition 1" is satisfied. However, the identification unit 115 may determine whether any one of these conditions is satisfied, or may make the determination by combining a part of the conditions. If it is determined that transition condition 1 is satisfied (YES in step S408), the processing proceeds to step S409. On the other hand, if it is determined that transition condition 1 is not satisfied (NO in step S408), the processing is finished.

However, when only the third condition relating to the number of times that a single-touch operation has been recognized is used, the following change is added. Specifically, processing for identifying that the apparatus is in a "single-touch state" is added to the processing of step S407. Namely, the information processing apparatus 100 recognizes a type of the input operation and counts the number of times of that operation. Further, if it is determined that transition condition 1 is not satisfied (NO in step S408), the identification unit 115 identifies a state of the touched point as the "0 to 1 transition state". Consequently, the problem can be avoided that the number of times that a single-touch operation has been recognized, does not become equal to or more than the threshold C. In this case, in step S504, the result of the single-touch operation recognized in step S407 is used.

In step S409, the identification unit 115 identifies the touch state of the information processing apparatus 100 as a "single-touch state", and stores information indicating "single-touch state". In addition, the touched point number acquisition unit 114 deletes the touched point number change history.

Next, in step S410, the identification unit 115 determines whether the number of touched points detected on the touch panel display 108 has decreased from the previous state and changed from two touched points to one touched point. The touched point number acquisition unit 114 determines whether the number of touched points was two before the number is changed to one, by referring to the touched point number change history stored in the storage unit 112 in step S305. If it is determined that the number of touched points has changed from two to one (YES in step S410), the processing proceeds to step S411. If it is determined that the number of touched points has not changed from two to one (NO in step S410), the processing is finished without identification of the touch state in this touch state identification processing. Such a case occurs, for example, when the touch state is identified as "single-touch state" in the previous touch state identification processing, and a single-touch operation is continuing.

In step S411, the identification unit 115 identifies the touch state of the information processing apparatus 100 as a "2 to 1 transition state", and stores information indicating "2 to 1 transition state".

In step S412, the identification unit 115 adjusts the content of a "transition condition 2" based on the state of the detected touched point. "Transition condition 2" is a condition for determining whether the information processing apparatus 100 in the "2 to 1 transition state" should recognize a single-touch operation based on one detected touched point. If the touched point state does satisfy "transition condition 2", in the present exemplary embodiment, it is considered that the user is trying to perform an operation with one touched point.

Four conditions will now be described as an example of "transition condition 2".

The first condition is that the elapsed time since the number of touched points changed from two to one is equal to or more than a threshold D. This threshold D is a length of time. Therefore, the identification unit 115 calculates the elapsed time up to the detection date and time at which the current touch event "TOUCH" is detected in step S301, by referring to information about the time at which the number of touched points changed. If the identification unit 115 determines that the calculated elapsed time is equal to or more than the predetermined threshold D, transition condition 2 is determined to be satisfied. In the state before adjustment is performed in step S412, the threshold D is 1 second.

The second condition is that the movement distance of the touched point since the number of touched points changed from two to one is equal to or more than a threshold E. This threshold E is a distance amount. Therefore, the identification unit 115 calculates the movement distance from the position of the touched point at the time when the number of touched points changed, to the newest detection position of the touched point having the same ID. If the identification unit 115 determines that the calculated movement distance is equal to or more than the predetermined threshold E, transition condition 2 is determined to be satisfied. In the state before adjustment is performed in step S412, the threshold E is 40 dots.

The third condition is that the number of times that a single-touch operation has been recognized since the number of touched points changed from two to one is equal to or more than a threshold F. This threshold F is a number of times. In step S409, a count is made each time a single-touch state is detected. Therefore, the identification unit 115 determines whether the number of times that a single-touch operation has been recognized since the detected number of touched points changed from two to one is equal to or more than the predetermined threshold F. If it is determined that the number of times is equal to or more than the threshold F, the identification unit 115 determines that transition condition 2 is satisfied. In the state before adjustment is performed in step S412, the threshold F is five times.

The fourth condition is that the angles representing the movement direction of the touched point before and after the number of touched points changed from two to one are different by a threshold G or more. This threshold G is the size of the angle. The identification unit 115 refers to and compares the movement direction stored in the storage unit 112 of the touched point before and after the time at which the touched point changed. Based on the comparison result, if it is determined that the absolute value of the calculated difference between the angles is equal to or more than the threshold G, the identification unit 115 determines that transition condition 2 is satisfied. The threshold G is, for example, 45°. Further, the calculation is not limited to using an absolute value. Threshold G may be calculated as ±45°.

The thresholds D, E, and F used in "transition condition 2" are greater than the thresholds A, B, and C used in "transition condition 1". Generally, the user tends to pay less attention to the number of touched points in the touch panel display 108 which he/she is laying fingers on when the user has finished a multi-touch operation and is decreasing the number of touched points, than when the user is trying to start a touch operation and increase the number of touched points. Therefore, when the number of touched points has decreased, since there is a high likelihood that the number of touched points that are detected is different from the number intended by the user, malfunctions can occur more easily. Accordingly, when the number of touched points has decreased, malfunctions can be reduced more accurately by increasing the strictness of the condition for recognizing an operation. Further, even when the user intends to consecutively perform a single-touch operation after a multi-touch operation, if the condition is satisfied, the user can perform a single-touch operation as intended. On the other hand, when there is a high likelihood that the user has increased the number of touched points in order to perform an operation, by determining whether to recognize an operation or not based on a relatively easier condition, a response to the touch operation can be rapidly made. Therefore, responsiveness to operations can be maintained and a deterioration in user operability can be prevented while reducing malfunctions.

In step S412, to increase the effect of reducing malfunctions while maintaining operability, the three thresholds D, E, and F of transition condition 2 are adjusted. Two adjustment methods according to the present exemplary embodiment will be described here.

One method is to adjust the above-described three thresholds based on a movement velocity of the touched point immediately before the number of touched points changes. First, a case in which the touched point movement velocity is large will be described. In a state in which a multi-touch operation has finished, and the number of touched points is gradually decreasing (hereinafter, "state A"), if the user moves the touched point a certain distance, the time that the touched point is moving is relatively shorter. Similarly, in state A, if the user moves the touched point for a certain duration, the distance moved is relatively greater. Therefore, if the movement distance of a detected touched point at a fixed period is greater than the distance threshold, the number of times that a single-touch state is identified increases. Therefore, the length of time threshold D is adjusted from 1 second to 0.5 seconds, the amount of distance threshold E is adjusted from 50 dots to 100 dots, and a threshold F of the number of times that a single-touch operation is recognized is adjusted from 5 times to 10 times.

Next, a case in which the touched point movement velocity is small will be described. In state A, if the user moves a touched point a certain distance, the time that the touched point is moving is relatively longer. Similarly, in state A, if the user moves a touched point for a certain duration, the distance moved is relatively smaller. Therefore, if the movement distance of a detected touched point at a fixed period is greater than the distance threshold, the number of times that a single-touch state is identified decreases. Therefore, threshold D is adjusted from 1 second to 2 seconds, threshold E is adjusted from 50 dots to 30 dots, and threshold F is adjusted from 5 times to 3 times.

Whether the user operation is based on "a certain distance" or the "a certain duration" depends on each user's style, and cannot be specifically limited. It is desirable to perform an adjustment that is appropriate for each user.

A second method is to adjust the above-described three thresholds based on the touch operation that is recognized before the number of touched points changes. First, a case will be described in which a multi-drag, which, because the movement direction of the plurality of touched points is the same, is performed with a strong momentum, is recognized before the number of touched points changes. In state A, if the operation is performed with a strong momentum, the time that the touched points are moving tends to be shorter. However, the distance that the touched points move tends to be greater, and the number of times that an operation is recognized tends to be greater. Therefore, the length of time threshold D is adjusted from 1 second to 0.7 seconds, the amount of distance threshold E is adjusted from 50 dots to 70 dots, and the threshold F of the number of times that an operation is recognized is adjusted from 5 times to 7 times.

Next, a case will be described in which a pinch or rotate operation performed with a relatively weak momentum, because the movement direction of the plurality of touched points is different, is recognized before the number of touched points changes. In state A, if the operation momentum is small, the time that the touched points are moving tends to be greater. However, the distance that the touched points move tends to be smaller, and the number of times that an operation is recognized tends to be smaller. Therefore, threshold D is adjusted from 1 second to 1.5 seconds, threshold E is adjusted from 50 dots to 40 dots, and threshold F is adjusted from 5 times to 4 times.

The tendency of the above-described operation depends on each user's style, and cannot be specifically limited. It is desirable to perform an adjustment that is appropriate for each user.

The above-described threshold adjustment processing (step S412) may be omitted. If this processing is performed without omitting it, the adjusted thresholds are also greater than the thresholds A, B, and C used for transition condition 1. Specifically, the adjusted transition condition 2 is set so as to be stricter than transition condition 1. The threshold for transition condition 2 is set based on either of the methods described above, and then the processing proceeds to step S413.

In step S413, the identification unit 115 determines whether the state of the detected touched point satisfies the above-described "transition condition 2". The identification unit 115 refers to the detection date and time and the coordinates of the touched point that are stored in the storage unit 112, and determines whether these pieces of information satisfy "transition condition 2". "Transition condition 2" is a condition for determining whether the information processing apparatus 100 should recognize a single-touch operation based on the detected one touched point. If it is determined that transition condition 2 is satisfied (YES in step S413), the processing proceeds to step S409. On the other hand, if it is determined that transition condition 2 is not satisfied (NO in step S413), the touch state determination processing is finished.

If in step S412 of the present exemplary embodiment, any one of the above-described four conditions is satisfied, the identification unit 115 determines that "transition condition 2" is satisfied. However, the identification unit 115 may determine whether any one of these conditions is satisfied, or may perform the determination by combining some of the conditions. However, when only the third condition relating to the number of times that a single-touch operation has been recognized is used, in step S411 "single-touch state" is identified. In this case, the specific operation is recognized, and the number of times of that operation is counted. Further, if it is determined that transition condition 2 is not satisfied (NO in step S413), the identification unit 115 identifies the "2 to 1 transition state". Consequently, the problem that the number of times that a single-touch operation has been recognized does not become equal to or more than the threshold F can be avoided. In this case, in step S504, the result of the single-touch operation recognized in step S411 is used.

Figure 5:
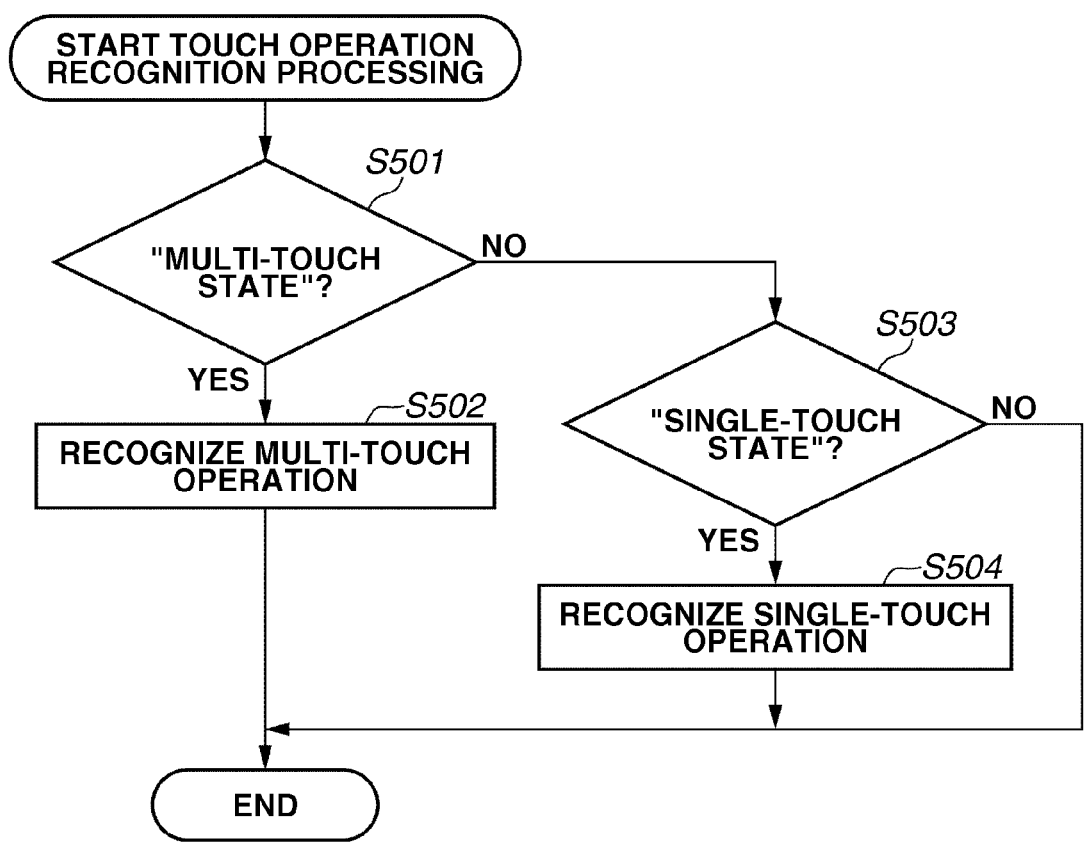
FIG. 5 illustrates an example of an operation recognition processing flow executed by an information processing apparatus.

FIG. 5 is a flowchart illustrating the touch operation recognition processing flow executed in step S203. In the present exemplary embodiment, a single-touch operation or a multi-touch operation is recognized based on the identification result of the touch state identification processing in step S202.

First, in step S501, the recognition unit 116 determines whether the state identified by the touch state identification processing is a "multi-touch state" by referring to the stored information. If it is determined that the identified state is a "multi-touch state" (YES in step S501), the processing proceeds to step S502. If it is determined that the identified state is not a "multi-touch state" (NO in step S501), the processing proceeds to step S503.

In step S502, the recognition unit 116 recognizes a multi-touch operation. Specifically, the recognition unit 116 compares the operation information acquired in step S307 with a pre-stored multi-touch operation recognition condition, and recognizes operation information that meets the condition as an instruction for a multi-touch operation. For example, if two touched points are moved in the same movement direction while the distance between them is maintained at a roughly fixed distance, the operation is recognized as a multi-drag operation. Further, if two touched points are moved so that the distance between them has expanded or contracted compared with the previous detection, the operation is recognized as a pinch operation. When the recognition unit 116 recognizes a multi-touch operation, the processing is finished.

In step S503, the recognition unit 116 determines whether the state identified by the touch state identification processing is a "single-touch state" by referring to the stored information. If it is determined that the identified state is a "single-touch state" (YES in step S503), the processing proceeds to step S504. If it is determined that the identified state is not a "single-touch state" (NO in step S503), the processing is finished. In the present exemplary embodiment, since a touch operation is not recognized if the information processing apparatus 100 is in a "no touch state", a "0 to 1 transition state", or a "2 to 1 transition state", the determination in step S503 is "NO".

In step S504, the recognition unit 116 recognizes a single-touch operation. In the present exemplary embodiment, in the "single-touch state" a move operation is recognized. The recognition unit 116 compares the operation information acquired in step S307 with a move operation recognition condition. The move operation recognition condition is that a number of the touched points is one and moves a distance of an arbitrary threshold or more. If the operation information meets the recognition condition, the operation information is recognized as a move operation instruction, and the processing is finished.

The above is the flow of the processing executed by the information processing apparatus 100. Thus, in the present exemplary embodiment, when the number of detected touched points is one, the information processing apparatus 100 may be considered to be in a "transition state" in which it is highly likely that the number of touched points is in transition, so that the determination whether to recognize a single-touch operation is made based on whether a predetermined condition is satisfied. Therefore, when the user starts or finishes a touch operation, malfunctions in which the execution of a single-touch operation that is not intended by the user can be reduced. In addition, user operability can be maintained in cases in which the user wants to perform an operation based on a single touch.

Figure 6:
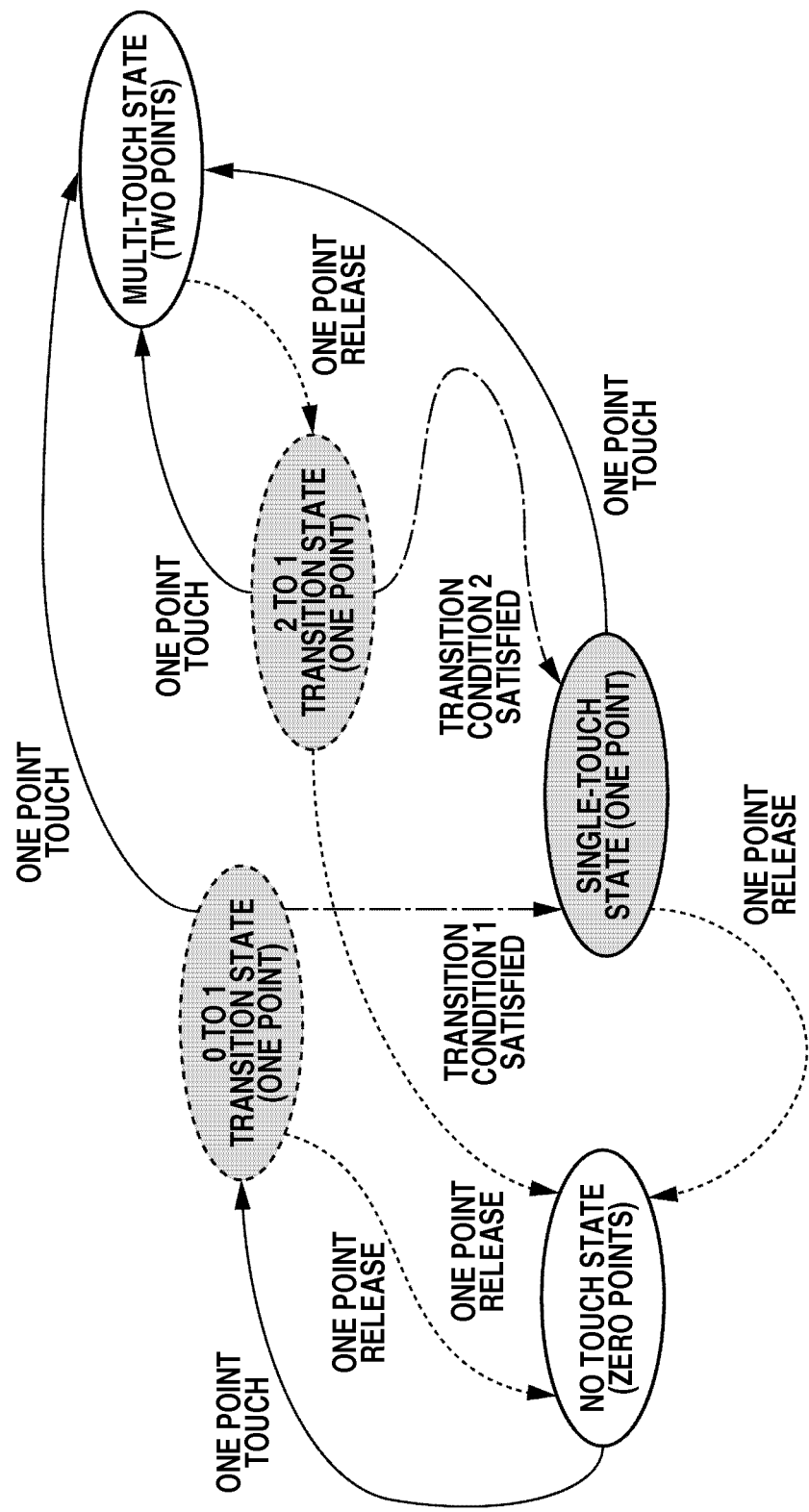
FIG. 6 is a touch state transition diagram when an information processing apparatus operates based on two or less touched points.

FIG. 6 is a state transition diagram illustrating state transitions in the touch state when the user performs a touch operation from zero to two points.

First, if the user has not performed an operation, the touch state of the information processing apparatus 100 is a "no touch state". In this state, when one touched point is detected, the state transitions to a "0 to 1 transition state". In the "0 to 1 transition state", when one touched point is released, the state transitions to the "no touch state". In the "0 to 1 transition state", if transition condition 1 is satisfied, the state transitions to a single-touch state. Further, in the "0 to 1 transition state", if another touched point is detected, the state transitions to a "multi-touch state". Next, in the "multi-touch state", when one touched point is released, the state transitions to a "2 to 1 transition state". Next, in the "2 to 1 transition state", when one touched point is released, the state transitions to the "no touch state". Further, in the "2 to 1 transition state", if transition condition 2 is satisfied, the state transitions to the "single-touch state". In the "2 to 1 transition state", if another touched point is detected, the state transitions to a "multi-touch state".

Figure 7:
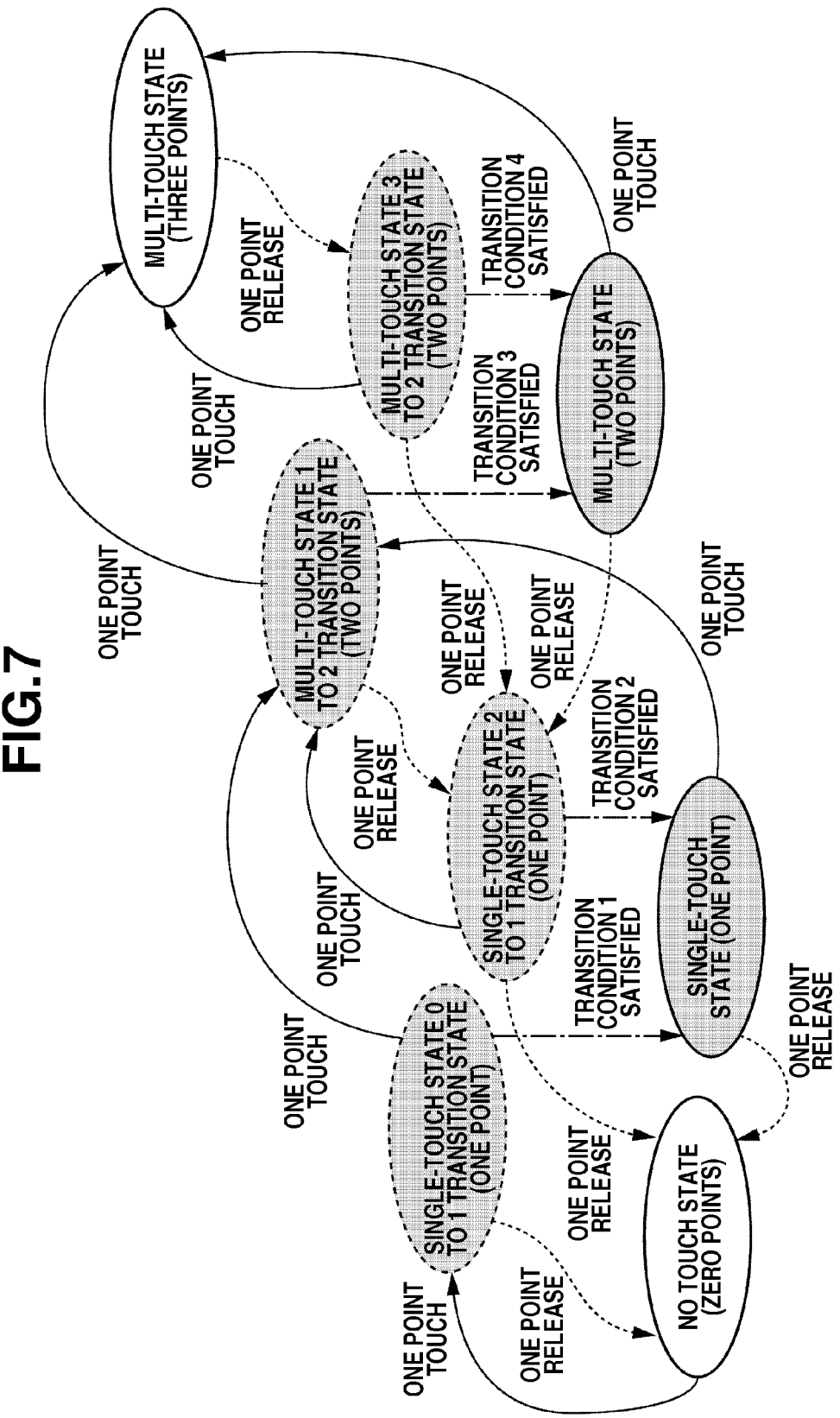
FIG. 7 is a touch state transition diagram when an information processing apparatus operates based on three or less touched points.

Although the present exemplary embodiment is described based on an example in which the multi-touch operation is configured from two touched points, the present exemplary embodiment is also applicable in cases in which three or more touched points are used. For example, FIG. 7 illustrates state transitions among touched points when the user performs a touch operation from zero to three points. The differences with FIG. 6 will be described. In a "three-point multi-touch state", a multi-touch operation configured from three touched points can be performed, which is different from a "two-point multi-touch state", in which a multi-touch operation configured from two touched points can be performed. Further, there are an additional two transition states, a "1 to 2 transition state" and a "3 to 2 transition state". In the "1 to 2 transition state", the state transitions to the "two-point multi-touch state" only when a transition condition 3 is satisfied. On the other hand, in the "3 to 2 transition state", only when a transition condition 4 is satisfied, the state transitions to the "two-point multi-touch state", and a multi-touch operation based on two touched points is recognized. If the transition condition is not satisfied, since there is a high likelihood that the number of touched points is in the middle of transitioning, the operation is not recognized. At this stage, the transition condition 4 for the "3 to 2 transition state" when the number of touched points has decreased to two is stricter than the transition condition 3 for the "1 to 2 transition state" when the number of touched points has increased to two. This is because when the number of touched points has decreased, there is a high likelihood that a multi-touch operation configured from a greater number of touched points has finished, and that a touch is in the middle of being released, so that any operation is not intended. Similarly, the present exemplary embodiment can also be applied to an information processing apparatus 100 in which a touch operation is performed from zero to N points.

Figure 8:
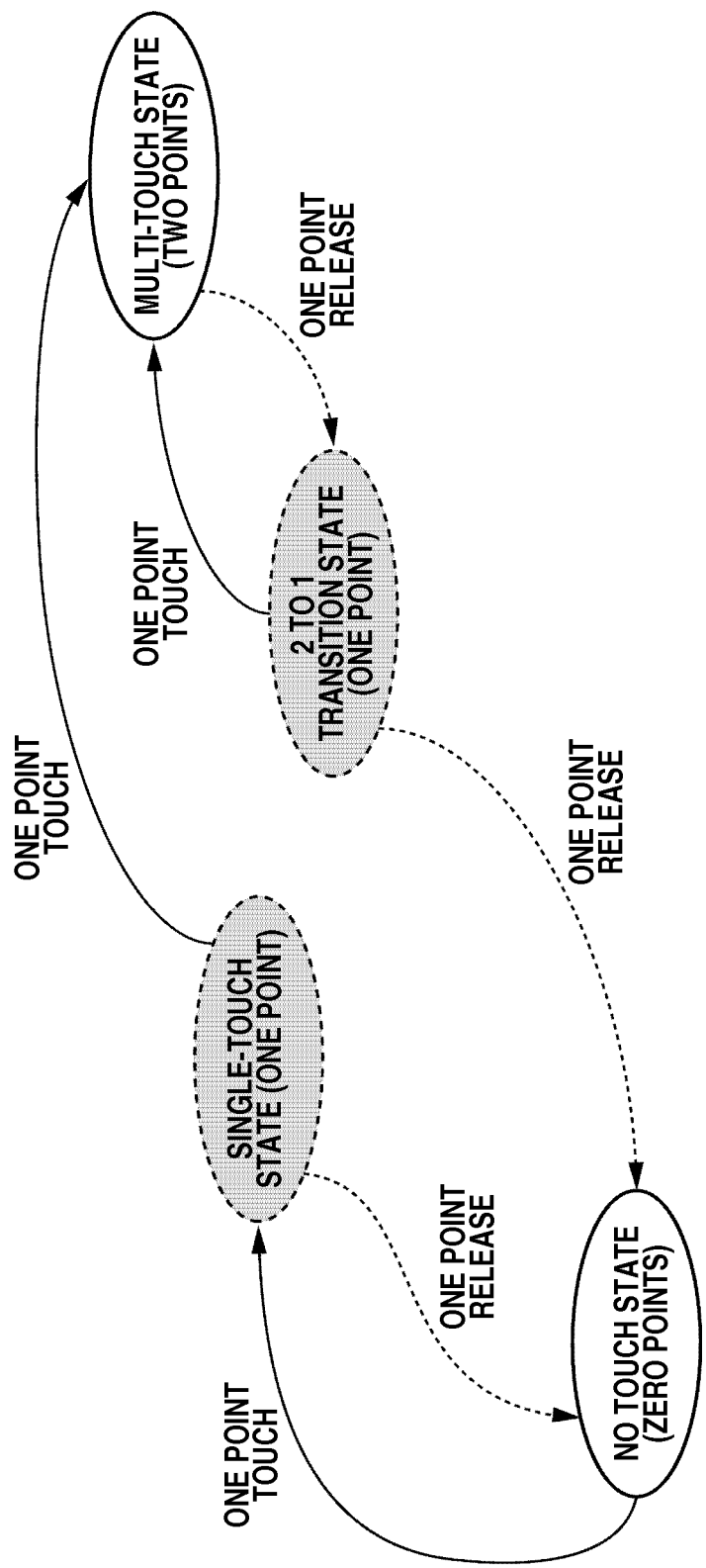
FIG. 8 is an abridged touch state transition diagram when an information processing apparatus operates based on two or less touched points.

Further, FIG. 8 illustrates, as a modified example of the first exemplary embodiment, state transitions among touched points when the user performs a touch operation from zero to two points. The modified example does not include the transition from the "2 to 1 transition state", in which only one touched point is detected, to the "single-touch state" based on satisfaction of a transition condition. Further, when transitioning from zero points to one point, the state transitions to the "single-touch state", and a single-touch operation is recognized. As described above, the user generally tends to pay less attention to his/her contact with the touch panel display 108 when the user has finished a multi-touch operation and is decreasing the number of touched points than when the user is trying to start a touch operation and increase the number of touched points. Therefore, when the number of touched points has decreased to one point, there is a high likelihood that a multi-touch operation has finished, and that a touch is in the middle of being released, so that a single-touch operation is not intended. Consequently, in the modified example of the first exemplary embodiment, when the number of touched points has decreased from two to one, the operation is not recognized, and when the number of touched points has increased from zero to one, a single-touch operation is recognized. Even based on such a configuration, there is still the advantageous effect that malfunctions in which a single-touch operation not intended by the user are executed are reduced.

Specific operation examples in which a touch operation is input into the information processing apparatus 100 according to the first exemplary embodiment will now be described with reference to the drawings.

Figure 9:
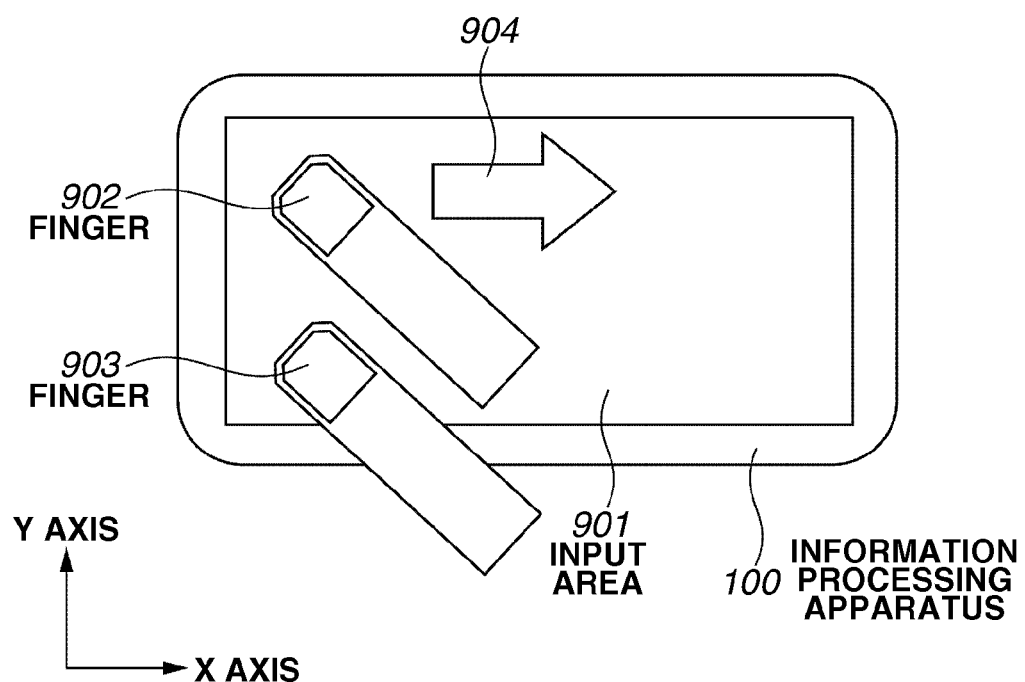
FIG. 9 illustrates an example of a touch operation performed by a user.

FIG. 9 illustrates an example of an operation in the information processing apparatus 100 according to the first exemplary embodiment, in which the user is inputting an operation on the operation face 901 of the information processing apparatus 100. The operation face 901 is configured from the touch panel display 108, in which a touch panel is arranged on a display. The operation face 901 is an area on which touches made by the user can be detected by the touch panel. In the present exemplary embodiment, coordinate information representing the position of the points touched by the user on a coordinate plane over the whole of the operation face 901 is detected. In the coordinate plane, the bottom left of the operation face 901 is the origin, the horizontal direction is the X axis, and the vertical direction is the Y axis. FIG. 9 illustrates an operation in which a multi-drag operation is performed by bringing two fingers 902 and 903 into contact with the operation face 901, and moving them in the direction indicated by arrow 904. Further, a move operation in which only the finger 902 is brought into contact with the operation face 901 and moved in the horizontal direction will be described below.

Operation Example 1

Figure 10A:
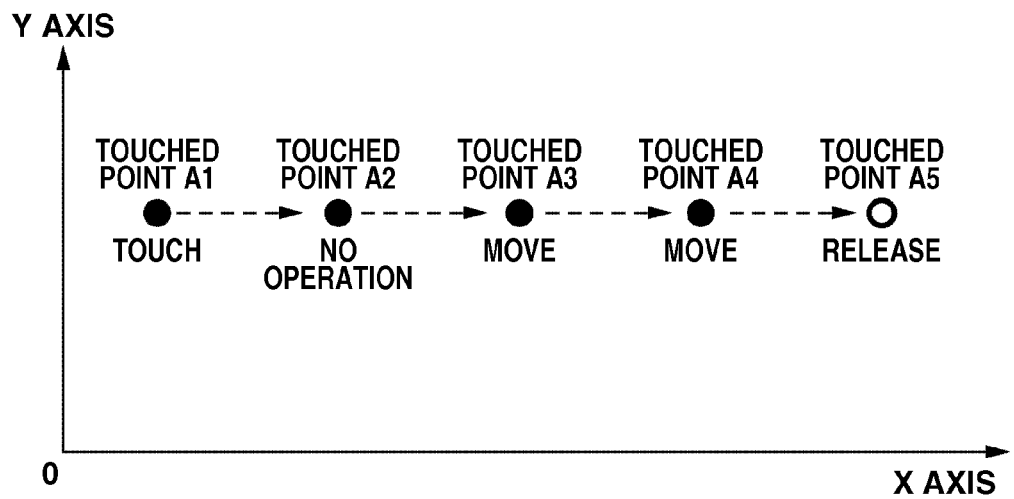
FIGS. 10A and 10B illustrate examples of shifts in the position of a touched point during a touch operation.

FIG. 10A illustrates Operation Example 1, which is an example of shifts in the positions of touched points acquired by the information processing apparatus 100 when the user has performed a move operation by touching with one finger and moving horizontally. Touched points A1 to A5 show shifts in the positions to which the touched points touched by the user's finger on the operation face 901 have moved. The position first touched by the user's finger 902 on the operation face 901 is touched point A1. Next, the user's finger 902 is horizontally moved. The position that is touched after the movement corresponds to touched point A2. Further, when the finger is similarly horizontally moved, the touched position becomes touched points A3 and A4. Finally, the user releases his/her finger 902 from the touch panel at the position corresponding to touched point A5.

Based on this series of operations, operation of the information processing apparatus 100 according to the present exemplary embodiment will be described. In Operation Example 1, the touch panel display 108 scans touch sensors on the operation face 901 every 20 milliseconds, and sequentially notifies the detection unit 111 of detected touch events point by point.

First, in a state in which the user has initially touched the operation face 901, the touch event "TOUCH" of the touched point A1 is notified from the touch panel display 108. In the information processing apparatus 100, in step S301, the fact that the touched point A1 has been newly touched in the touched point detection processing of step S201 is detected by the detection unit 111. Then, in step S304, information that the ID is 1, the position coordinate is (10,100), and the detection time is zero milliseconds is stored in the storage unit 112. Further, in step S305, the touched point number acquisition unit 114 acquires the fact that the number of touched points is one from the number of detected IDs, and in step S307, stores the movement distance for the first detected touched point as zero dot.

Next, in the touch state identification processing of step S202, the identification unit 115 identifies the touch state by referring to the stored information. At this stage, the number of touched points is one, so that the number of touched points has changed from zero points to one point (YES in step S406). Further, since transition condition 1 is not satisfied (NO in step S408), in step S407, the touch state is identified as a "0 to 1 transition state".

In the touch operation recognition processing of step S203, the recognition unit 116 recognizes the touch operation by referring to the information stored in the storage unit 112. At this stage, since the touch state is a "0 to 1 transition state", the processing is finished without performing identification processing (NO in steps S501 and S503).

In step S204, the display control unit 117 displays the operation result from the touch operation. At this stage, since there is no recognized touch operation, the display is not changed.

Similarly, first, the touch event "TOUCH" of the touched point A2 from the touch panel is notified. In the information processing apparatus 100, in step S301, the touched point A2 is detected by the detection unit 111. Then, in step S306, information that the ID is 1, the position coordinate is (20,100), the detection time is 20 milliseconds, and the number of touched points is one is stored in the storage unit 112. Further, in step S307, the movement distance is calculated as 20−10=10 dots, and the calculated movement distance is stored. At this stage, the number of touched points is one, so that there is no change to the history that the number of touched points changed from zero points to one point (YES in step S406). Further, the elapsed time since the change in the number of touched points is 20 ms, the touched point movement distance is 10 dots, and the number of times of single-touch detection is zero, so that transition condition 1 is not satisfied. Thus, the touch state remains as a "0 to 1 transition state" (NO in step S408). Therefore, the processing is finished without performing recognition of the touch operation (NO in steps S501 and S503). Since there is no recognized touch operation, in step S204, the display is not changed.

Next, the touch event "TOUCH" of the touched point A3 is notified from the touch panel, and in step S301, the touched point A3 is detected by the detection unit 111. Then, in step S306, information that the ID is 1, the position coordinate is (30,100), the detection time is 40 milliseconds, and the number of touched points is one is acquired and stored in the storage unit 112. Further, in step S307, the movement distance is calculated as 30−10=20 dots, and the calculated movement distance is stored. At this stage, the number of touched points is one, so that there is no change in the state that the number of touched points has changed from zero points to one point (YES in step S406). Therefore, first, in step S407, the identification unit 115 identifies that the touch state is a "0 to 1 transition state". On the other hand, since the movement distance is 20 dots, transition condition 1 is satisfied (YES in step S408). Therefore, in step S409, the touch state is identified by the identification unit 115 as a "single-touch state", and a change history of the touched point number is deleted. Next, since the touch state is a "single-touch state", the recognition unit 116 executes recognition processing of the single-touch operation. In Operation Example 1, the move operation recognition condition is a movement of 10 dots or more. Since the touched point has moved 20 dots in the X axis direction, in step S504, the recognition unit 116 recognizes a move. Since the move operation is input in the right direction in a state in which the whole image is displayed on the display, in step S204, the displayed image is scrolled by the display control unit 117, and a display image like that displayed by the previous image is output.

Next, the touch event "TOUCH" of the touched point A4 is notified from the touch panel, and in step S301, the touched point A4 is detected by the detection unit 111. Then, in step S306, information that the ID is 1, the position coordinate is (40,100), the detection time is 60 milliseconds, and the number of touched points is one is acquired and stored in the storage unit 112. Further, in step S307, the movement distance is calculated as 40−10=30 dots, and the calculated movement distance is stored. At this stage, when the move operation is recognized, the reference point for calculating the movement distance changes from A1 to A3. The identification unit 115 identifies the touch state by referring to the stored information. At this stage, since the number of touched points is one and there is no touched point number history (NO in steps S406 and S410), the touch state remains in a single-touch state (YES in step S503). Therefore, the recognition unit 116 executes single-touch operation recognition processing. Since the touched point has moved 10 dots in the X axis direction, the recognition unit 116 recognizes the operation as a move. In step S504, the recognition unit 116 notifies that a move has occurred. Similar to touched point A4, since the touch operation is recognized as a move, and since the whole image is displayed on the display, in step S204, the displayed image is scrolled by the display control unit 117, and a display image like that displayed by the previous image is output.

Next, the touch event "RELEASE" of the touched point A5 is notified from the touch panel, and in step S302, information about the touched point having the ID 1 is deleted by the detection unit 111 from the information stored in the storage unit 112. The identification unit 115 identifies the touch state by referring to the stored information. At this stage, since the number of touched point is zero, in step S402, the identification unit 115 identifies that the touch state is a "no touch state". Further, since the state is a "no touch state", the recognition unit 116 does not recognize a touch operation, and the processing is finished (NO in step S503). Further, in step S204, since there is no recognized touch operation, the display is not changed.

The above is a description of Operation Example 1, which illustrates a specific example of when the user performs a move operation based on a single touch. Thus, in the present exemplary embodiment, when the number of touched points increases from the previous zero points to one point, by satisfying transition condition 1, a single-touch operation is recognized. Therefore, malfunctions can be reduced without causing a deterioration in user operability of the operation that the user wants to perform based on a single touch.

Operation Example 2

Figure 10B:
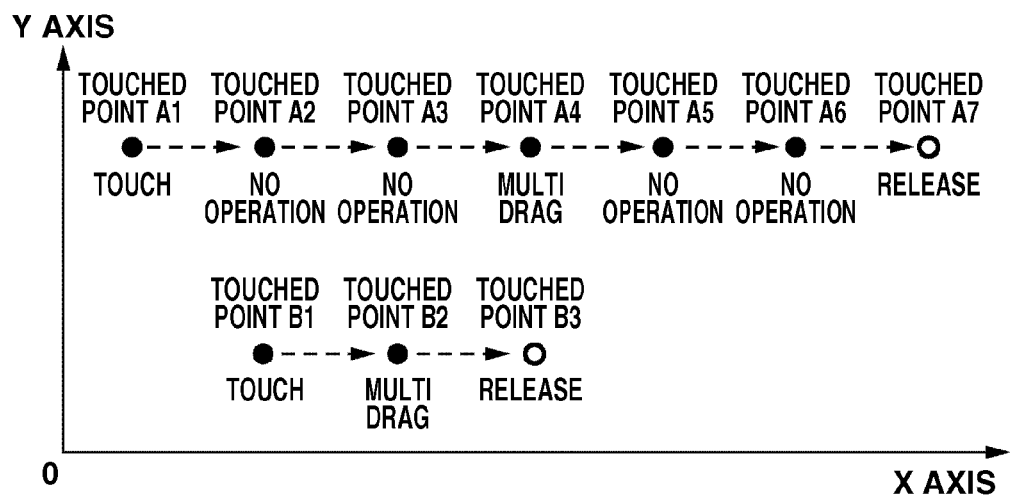

FIG. 10B illustrates an example of shifts in the positions of touched points acquired by the information processing apparatus 100 in Operation Example 2, in which the user performs a multi-drag operation by touching with two fingers and moving them horizontally. Touched points A1 to A7 and touched points B1 to B3 represent the coordinates of the positions touched by the user's fingers on the operation face 901. Similar to Operation Example 1, the X axis represents the horizontal axis and the Y axis represents the vertical axis. The position first touched by the user's finger 902 on the operation face 901 is touched point A1. Next, the user horizontally moves his/her finger 902 so that touched points move until A2 to A6. Finally, the position at which the user releases his/her finger 902 from the touch panel is touched point A7. Further, the position touched by the user's other finger 903 on the operation face 901 is touched point B1. Similarly, the user horizontally moves his/her finger 903 so that the touched point moves to B2, and releases his/her finger 903 from the touch panel at the position of touched point B3.

Now, based on this series of operations, operation of the information processing apparatus 100 will be described.

First, the touch event "TOUCH" of the touched point A1 is notified from the touch panel, and the fact that the touched point A1 has been newly touched is detected by the detection unit 111. Then, in step S304, information that the ID is 1, the position coordinate is (10,150), and the detection time is zero milliseconds is stored. Further, in step S305, the touched point number acquisition unit 114 acquires the number of touched points from the number of IDs, and stores the change history that the number of touched points has changed from zero points to one point. In addition, since this is the first detected touched point, in step S307, the operation information acquisition unit 113 stores the movement distance as zero dot. At this stage, since the number of touched points is one and the number of touched points is currently changed from zero points to one point, transition condition 1 will not be. Therefore, the identification unit 115 identifies that the touch state is a "0 to 1 transition state" (NO in step S408). Moreover, since the touch state is a "0 to 1 transition state", the recognition unit 116 finishes the processing without performing identification processing (NO in step S503). At this stage, since there is no recognized touch operation, in step S204, the display is not changed.

Next, the touch event "TOUCH" of the touched point A2 is notified from the touch panel, and the touched point A2 is detected by the detection unit 111. Then, in step S306, information regarding the touched point A2 that the ID is 1, the position coordinate is (20,150), the detection time is 20 milliseconds, and the number of touched points is one is stored. Further, the movement distance is calculated as 20−10=10 dots, and the movement direction of the touched point is calculated. For example, in step S307, if the Y axis is the reference axis, the movement direction in the clockwise direction is calculated to be 90°. At this stage, the number of touched points is one. The history that the number of touched points has changed from zero points to one point is stored, and the movement distance is 10 dots, so that transition condition 1 is not satisfied (NO in step S408). Therefore, the touch state remains as a "0 to 1 transition state". Since the identified touch state is a "0 to 1 transition state", the recognition unit 116 does not recognize a touch operation (NO in steps S501 and S503). In addition, since there is no recognized touch operation, in step S204, the display image is not changed.

Next, the touch event "TOUCH" of the touched point B1 is notified from the touch panel, and the touched point B1 is newly detected by the detection unit 111. Then, information that the ID is 2, the position coordinate is (20,50), and the detection time is 25 milliseconds is acquired and stored. Further, in step S305, the touched point number acquisition unit 114 acquires the fact that the number of touched points is two from the number of IDs, and stores the history that the number of touched points has changed from one point to two points. In addition, since this touched point is detected for the first time, in step S307, operation information that the movement distance is zero dot, that there is no movement direction, and that the distance between touched point A2 and touched point B1 is 100 dots is acquired. At this stage, since the number of touched points is two, in step S404, the identification unit 115 identifies that the touch state of the information processing apparatus 100 is a "multi-touch state". Since the touch state is a "multi-touch state", in step S502, the recognition unit 116 recognizes multi-touch operation. In the present exemplary embodiment, the recognition unit 116 compares, as a multi-touch operation, the recognition condition for a multi-drag operation and the recognition condition for a pinch operation with the operation information acquired in step S307. At the stage when the touched point B1 is detected, since none of the recognition conditions are satisfied, there is no multi-touch operation recognition result. Since there is no recognized touch operation, in step S204, the display content is also not changed. In Operation Example 2, as the multi-drag operation recognition condition, a determination is made whether two touched points have been moved 10 dots or more in the same movement direction while the distance between them is maintained at a roughly fixed distance. Further, as the pinch operation recognition condition, a determination is made whether the distance between two touched points has changed by ±10 dots or more from the previous time.

Next, the touch event "TOUCH" of the touched point A3 is notified from the touch panel, and the touched point A3 is detected by the detection unit 111. Then, in step S306, information that the ID is 1, the position coordinate is (30,150), the detection time is 40 milliseconds, and the number of touched points is two is stored. Since a touched point having the same ID has already been detected, there is no change in the number of touched points, which remains two points. Further, in step S307, the movement distance is calculated to be 30−20=10 dots, the movement direction is 90°, and the distance between touched point A3 and touched point B1 is 101 dots, and this information is stored. At this stage, since the number of touched points is two (YES in step S403), in step S404, the touch state remains as a multi-touch state. Since the touch state is a "multi-touch state", the recognition unit 116 executes multi-touch operation recognition processing. However, since the movement direction of the two touched points is different, the operation is not a multi-drag operation. Further, since the amount of change (absolute value) in the distance between the two touched points is 101−100=1 dot, the operation is also not a pinch operation. Therefore, a multi-touch operation is not recognized. Since there is no recognized touch operation, in step S204, the display content is also not changed.

Next, the touch event "TOUCH" of the touched point B2 is notified from the touch panel, and the touched point B2 is detected by the detection unit 111. Then, in step S306, information that the ID is 2, the position coordinate is (30, 50), and the detection time is 45 milliseconds is acquired and stored in the storage unit 112. Since a touched point having the same ID has already been detected, there is no change in the number of touched points, which remains two points. Further, the movement distance of 30−20=10 dots, the movement direction of 90°, and the distance between touched point A3 and touched point B2 of 100 dots are acquired and respectively stored. Since the number of touched points is two, in step S404, the identification unit 115 identifies that the touch state is a "multi-touch state". Since the touch state is a "multi-touch state", the recognition unit 116 executes multi-touch operation recognition processing. At this stage, the acquired movement directions for the touched point (A3) of the ID 1 and the touched point (B2) of the ID 2 are both 90°, which are the same direction. Further, the acquired movement distance for the touched point B2 is 10 dots, which satisfies the multi-drag recognition condition. Therefore, the recognition unit 116 recognizes a multi-drag operation. The display control unit 117 displays the operation result based on the multi-drag operation. Since the multi-drag operation is input in the right direction in a state in which the whole image is displayed on the display 108, in step S204, the image is scrolled, and a display image that displays the image stored ten images before is generated and output.

Next, the touch event "TOUCH" of the touched point A4 is notified from the touch panel, and the touched point A4 is detected by the detection unit 111. Then, in step S306, information that the ID is 1, the position coordinate is (40,150), and the detection time is 60 milliseconds is stored. Since a touched point having the same ID has already been detected, there is no change in the number of touched points, which remains two points. Further, the movement distance is calculated as 40−30=10 dots, and the calculated movement distance is stored. However, at the stage when the multi-drag operation is recognized, the reference point for calculating the movement distance changes from A1 to A3. Further, in step S307, the movement direction of 90° and the distance between the two points of 101 dots are calculated, and the respective pieces of information are stored. Since the number of touched points is two, the identification unit 115 continues identifying that the touch state is a "multi-touch state". Since the movement direction of the touched point (A4) of the ID 1 and the movement direction of the touched point (B2) of the ID 2 are the same, and the newest movement distance acquired regarding the touched point A3 is 10 dots, the multi-drag operation recognition condition is satisfied. Therefore, the recognition unit 116 recognizes a multi-drag operation. Since the multi-drag operation is input in the right direction, in step S204, the display control unit 117 scrolls the image, and a display image that displays the image stored ten images before is generated and output.

Next, the touch event "RELEASE" of the touched point B3 is notified from the touch panel, and the fact that the user has released his/her touch of the touched point of the ID 2 is detected by the detection unit 111. Then, the detection unit 111 deletes the information relating to the touched point of the ID 2 from the information stored in the storage unit 112. Since the number of touched points is one, and the number of touched points is currently changed from two points to one point (YES in step S410), the transition condition 2 will not be satisfied (NO in step S413). Therefore, in step S411, the identification unit 115 identifies that the touch state is a "2 to 1 transition state". Since the touch state is a "2 to 1 transition state", the recognition unit 116 does not recognize a touch operation (NO in steps S501 and S503). Since there is no recognized touch operation, the display control unit 117 does not change the display content.

Next, the touch event "TOUCH" of the touched point A5 is notified from the touch panel, and the touched point A5 is detected by the detection unit 111. Then, in step S306, information that the ID is 1, the position coordinate is (50,150), and the detection time is 80 milliseconds is stored. Since a touched point having the same ID has already been detected, there is no change in the number of touched points, which remains one point. Further, in step S307, regarding the touched point A5, operation information that the movement distance is 50−40=10 dots and that the movement direction is 90° is calculated and stored. At this stage, since the number of touched points is one, the history that the number of touched points has changed from two points to one point is stored, and the movement distance is 10 dots, transition condition 2 is not satisfied (NO in step S413). Therefore, in step S411, the identification unit 115 identifies that the touch state is a "2 to 1 transition state". Since the touch state is a "2 to 1 transition state", the recognition unit 116 does not recognize a touch operation (NO in steps S501 and S503). Since there is no recognized touch operation, in step S204, the display control unit 117 does not change the display content.

Next, the touch event "TOUCH" of the touched point A6 is notified from the touch panel, and the touched point A6 is detected by the detection unit 111. Then, in step S306, information that the ID is 1, the position coordinate is (60,150), and the detection time is 100 milliseconds is stored. Since a touched point having the same ID has already been detected, there is no change in the number of touched points, which remains one point. Further, in step S307, the operation information acquisition unit 113 calculates the movement distance to be 60–40=20 dots and the movement direction to be 90°, and stores this operation information. At this stage, since the number of touched points is one, the history that the number of touched points has changed from two points to one point is stored, and the movement distance is 20 dots, transition condition 2 is not satisfied (NO in step S413). Therefore, in step S411, the identification unit 115 identifies that the touch state is a "2 to 1 transition state". Since the touch state is a "2 to 1 transition state", the recognition unit 116 does not recognize a touch operation (NO in steps S502 and S503). Since there is no recognized touch operation, in step S204, the display control unit 117 does not change the display content.

Next, the touch event "RELEASE" of the touched point A7 is notified from the touch panel, and in step S302, information about the touched point having the ID 1 is deleted by the detection unit 111 from the information stored in the storage unit 112. The identification unit 115 identifies the touch state by referring to the stored information. At this stage, since the number of touched point is zero, in step S402, the identification unit 115 identifies that the touch state is a "no touch state". Further, since the state is a "no touch state", the recognition unit 116 does not recognize a touch operation, and the processing is finished (NO in step S503). Further, in step S204, since there is no recognized touch operation, the display is not changed.

The above is a description of Operation Example 2, which illustrates a specific example of when the user performs a multi-drag operation. Thus, in the present exemplary embodiment, a single-touch operation is not recognized before or after the multi-touch operation is performed, when only one touched point is detected. Therefore, when the user starts or finishes a touch operation, malfunctions caused by the recognition of a single-touch operation that is not intended by the user can be reduced even if the timing for moving a plurality of fingers is off.

Operation Example 3

Figure 11A:
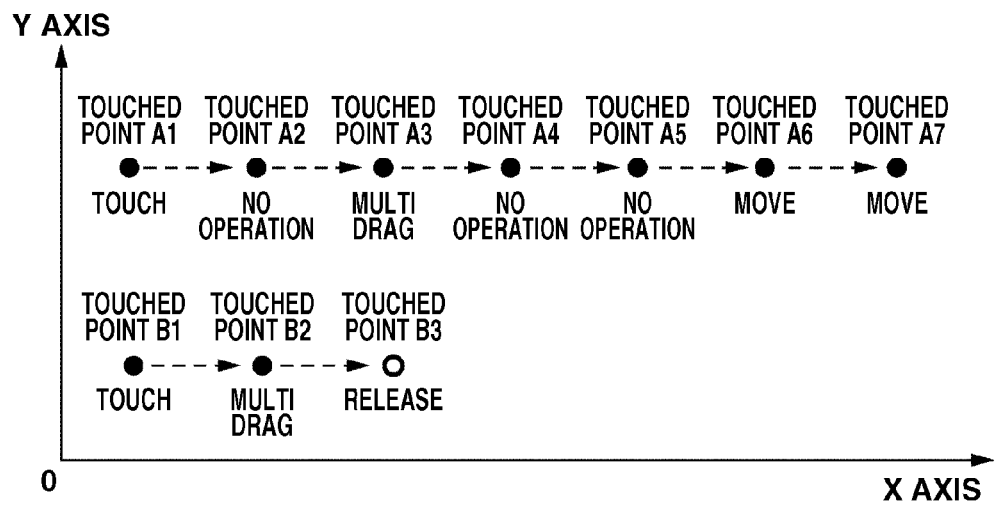
FIGS. 11A and 11B illustrate examples of shifts in the position of a touched point during a touch operation.

FIG. 11A illustrates an example of shifts in the positions of touched points acquired by the information processing apparatus 100 in Operation Example 3, in which after the user has performed a multi-drag operation by touching with two fingers and moving them horizontally, the user then performs a move operation by touching with one of the fingers. Touched points A1 to A7 and touched points B1 to B3 represent the coordinates of the positions touched by the user's fingers on the operation face 901. The X axis represents the horizontal axis and the Y axis represents the vertical axis. The position first touched by the user's finger 902 on the operation face 901 is touched point A1. Next, the user horizontally moves his/her finger 902 so that touched points move until A2 to A7. Further, the position touched by the user's other finger 903 on the operation face 901 is the touched point B1. Similarly, the user horizontally moves his/her finger 903 so that the touched point moves to B2, and releases his/her finger 903 from the touch panel at touched point B3.

Based on this series of operations, operation of the information processing apparatus 100 according to the present exemplary embodiment will be described. However, a detailed description of the processing steps common to Operation Examples 1 and 2 will be omitted here, and the description will focus on the differences.

First, the touch event "TOUCH" of the touched point A1 is notified from the touch panel. The detection unit 111 stores information regarding touched point A1 that the ID is 1, the position coordinate is (10,150), and the detection time is zero milliseconds. Further, the touched point number acquisition unit 114 acquires the number of touched points from the number of IDs, and stores the history that the number of touched points has changed from zero points to one point. In addition, since this is the first detected touched point, the operation information acquisition unit 113 acquires the movement distance of zero dot. The identification unit 115 refers to the touch information, and determines that since the number of touched points is one and the number of touched points has changed from zero points to one point, the transition condition 1 is not satisfied. Accordingly, the identification unit 115 identifies that the touch state is a "0 to 1 transition state". At this stage, since the touch state is a "0 to 1 transition state", the recognition unit 116 finishes the processing without performing identification processing. Since there is no recognized touch operation, the display content is not changed.

Next, the touch event "TOUCH" of the touched point B1 is notified. from the touch panel The detection unit 111 stores information regarding touched point B1 that the ID is 2, the position coordinate is (10,50), and the detection time is five milliseconds. Further, the touched point number acquisition unit 114 acquires the fact that the number of touched points is two from the number of IDs, and stores the history that the number of touched points has changed from one point to two points. In addition, since this touched point with the ID 2 is detected for the first time, the operation information acquisition unit 113 acquires the information that the movement distance is zero dot. Still further, the operation information acquisition unit 113 acquires and stores information that the distance between touched point A1 and touched point B1 is 100 dots.

At this stage, since the number of touched points is two, the identification unit 115 identifies that the touch state is a "multi-touch state". Therefore, the recognition unit 116 performs multi-touch operation recognition. However, at this stage, since the acquired operation information does not satisfy the recognition condition for either a multi-drag operation or a pinch operation, the operation is not recognized. The recognition conditions for each of these operations are the same as in Operation Example 2. Since there is no recognized touch operation, the display content is not changed.

Next, the touch event "TOUCH" of the touched point A2 is notified from the touch panel. The detection unit 111 stores information regarding touched point A2 that the ID is 1, the position coordinate is (20,150), and the detection time is 20 milliseconds. Since a touched point having the same ID has already been detected, there is no change in the number of touched points, which remains at two points. Further, the operation information acquisition unit 113 acquires and stores information that the movement distance from touched point A1 to touched point A2 is 20−10=10 dots, the movement direction is 90°, and the distance between touched point A2 and touched point B1 is 101 dots. Since the number of touched points is two, the identification unit 115 continues identifying that the touch state is a "multi-touch state". Therefore, the recognition unit 116 recognizes a multi-touch operation. However, at this stage, since the acquired operation information does not satisfy the recognition condition for either a multi-drag operation or a pinch operation, the operation is not recognized.

Since there is no recognized touch operation, the display is not changed.

Next, the touch event "TOUCH" of the touched point B2 is notified from the touch panel. The detection unit 111 stores information regarding touched point B2 that the ID is 2, the position coordinate is (20,50), and the detection time is 25 milliseconds. Since a touched point having the same ID has already been detected, there is no change in the number of touched points, which remains two points. Further, the operation information acquisition unit 113 acquires and stores information that the movement distance is 20−10=10 dots, the movement direction is 90°, and the distance between touched point A2 and touched point B2 is 100 dots. Since the number of touched points is two, the identification unit 115 identifies that the touch state is a "multi-touch state". Therefore, since the movement direction of the touched point A2 and the movement direction of the touched point B2 are the same, and the movement distance at the touched point B2 is 10 dots, which is equal to or more than the threshold, the recognition unit 116 recognizes a multi-drag operation. Since the multi-drag operation is input in the right direction in a state in which the whole image is displayed on the display 108, the display control unit 117 scrolls the image, and generates and outputs a display image for displaying the image stored ten images before.

Next, the touch event "TOUCH" of the touched point A3 is notified from the touch panel. The detection unit 111 stores information regarding touched point A3 that the ID is 1, the position coordinate is (30,150), and the detection time is 40 milliseconds. Since a touched point having the same ID has already been detected, there is no change in the number of touched points, which remains two points. Further, the operation information acquisition unit 113 acquires and stores information that the movement distance from touched point A2 to touched point A3 is 30−20=10 dots, the movement direction is 90°, and the distance between touched point A3 and touched point B2 is 101 dots. Since the number of touched points is two, the identification unit 115 continues identifying that the touch state is a "multi-touch state". Since the movement direction of the touched point A3 and the movement direction of the touched point B2 are the same, and the movement distance at the touched point A3 is 10 dots, which is equal to or more than the threshold, the recognition unit 116 recognizes a multi-drag operation. Since the multi-drag operation is input in the right direction in a state in which the whole image is displayed on the display 108, the display control unit 117 scrolls the image, and generates and outputs a display image for displaying the image stored ten images before.

Next, the touch event "RELEASE" of the touched point B3 is notified from the touch panel, and the fact that the user has released his/her touch of the touched point of the ID 2 is detected by the detection unit 111. Then, the detection unit 111 deletes the information relating to the touched point of the ID 2 from the information stored in the storage unit 112. The identification unit 115 identifies that the touch state is a "2 to 1 transition state". Since the touch state is a "2 to 1 transition state", the recognition unit 116 does not recognize a touch operation. Since there is no recognized touch operation, the display control unit 117 does not change the display content.

Next, the touch events "TOUCH" of the touched points A4 and A5 are notified from the touch panel. At this stage, since the processing executed by the information processing apparatus 100 is the same as the processing performed during detection of the touched points A5 and A6 in Operation Example 2, a detailed description thereof will be omitted here.

When the touch event "TOUCH" of the touched point A6 illustrated in FIG. 11A is notified, the detection unit 111 stores information regarding touched point A6 that the ID is 1, the position coordinate is (70,150), and the detection time is 100 milliseconds. Since a touched point having the same ID has already been detected, there is no change in the number of touched points, which remains one point. The operation information acquisition unit 113 calculates the movement distance from touched point A3 to touched point A6 to be 70−30=40 dots, and stores the calculated information. Since the history that the number of touched points has changed from two points to one point is stored, and since the calculated movement distance of 40 dots satisfies transition condition 2, the identification unit 115 identifies the touch state to be a "single-touch state", and deletes the change history of the number of touched points. Therefore, the recognition unit 116 compares the acquired operation information with the recognition condition for a single-touch operation. In the present exemplary embodiment, as the move operation recognition condition, a determination is made whether one touched point has moved 10 dots or more. Here, since the touched point (A6) of the ID 1 has moved 40 dots in the X axis direction, this operation is recognized as a move. Since a move operation in the right direction is recognized in a state in which the whole image is displayed on the display, the display control unit 117 scrolls the image, and displays the image stored one image before.

Next, the touch event "TOUCH" of the touched point A7 is notified from the touch panel, and based on the similar processing, a move operation based on a single touch is recognized.

The above is a description of Operation Example 3, in which after the user has performed a multi-drag operation by touching with two fingers and moving them horizontally, the user then performs a move operation by touching with one of the fingers. Thus, in the present exemplary embodiment, when the number of touched points decreases to one point after a multi-touch operation has been performed, recognition processing based on a specific result is performed by determining whether "transition condition 2" is satisfied.

Operation Example 4

Figure 11B:
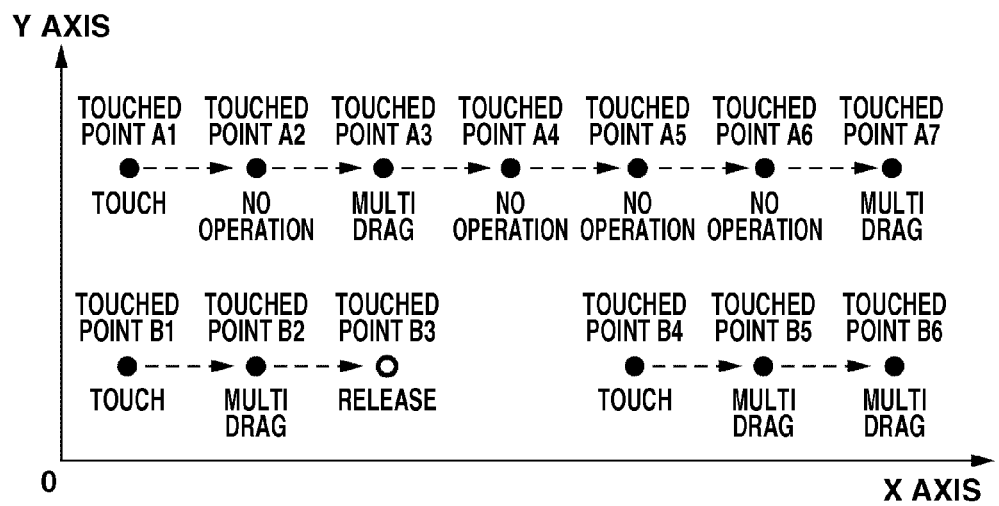

FIG. 11B illustrates an example of shifts in the positions of touched points acquired by the information processing apparatus 100 in Operation Example 4, in which during a multi-drag operation performed by the user touching with two fingers and moving them horizontally, one point is released, and then the multi-drag operation is continued. Touched points A1 to A7 and touched points B1 to B6 represent the coordinates of the positions touched by the user's fingers on the operation face 901. The X axis represents the horizontal axis and the Y axis represents the vertical axis. The position first touched by the user's finger 902 on the operation face 901 is touched point A1. Next, the user horizontally moves his/her finger 902 so that touched points move until A2 to A7. Further, the position touched by the user's other finger 903 on the operation face 901 is touched point B1. Similarly, the user horizontally moves his/her finger 903 so that the touched point moves to B2, and releases his/her finger 903 from the touch panel at touched point B3. Then, the position again touched by the finger 903 on the operation face 901 becomes touched point B4. The user further horizontally moves his/her finger 903, and the touched points become B5 and B6.

Based on this series of operations, operation of the information processing apparatus 100 according to the present exemplary embodiment will be described. However, since the processing executed when the touch events of the touched points A1, B1, A2, B2, A3, B3, A4, and A5 are detected by the information processing apparatus 100 is similar to that described above in Operation Example 3, a detailed description thereof will be omitted here, and the description will focus on the differences with Operation Example 3.

When the touch event "TOUCH" of the touched point B4 is notified from the touch panel, the detection unit 111 acquires and stores information that the ID is 2, the position coordinate is (50, 50), and the detection time is 85 milliseconds. Further, the touched point number acquisition unit 114 acquires the fact that the number of touched points is two from the number of IDs, and stores the history that the number of touched points has changed from one point to two points. In addition, since this touched point of the ID 2 is detected for the first time, the operation information acquisition unit 113 acquires information that the movement distance is zero dot, there is no movement direction, and the distance between touched point A5 and touched point B4 is 100 dots, and stores each of these pieces of information. Since the number of touched points is two, the identification unit 115 identifies that the touch state is a "multi-touch state". Since the multi-touch operation recognition condition is not satisfied, at this stage, the recognition unit 116 does not recognize a multi-touch operation. Therefore, the display content also is not changed.

Next, when the touch event "TOUCH" of the touched point A6 is notified from the touch panel, information that the ID is 1, the position coordinate is (60,150), the detection time is 100 milliseconds, and the number of touched points is two is stored in the storage unit 112. Further, since the number of touched points has changed, the reference point has changed. The operation information acquisition unit 113 calculates and stores information that the movement distance from touched point A5 to touched point A6 is 60−50=10 dots, the movement direction is 90°, and the distance between touched point A6 and touched point B4 is 101 dots. Although the touch state continues to be a "multi-touch state" also at this stage, since the multi-touch operation recognition condition is not satisfied, at this stage, a multi-touch operation is not recognized. Therefore, the display content also is not changed.

Next, when the touch event "TOUCH" of the touched point B5 is notified from the touch panel, information that the ID is 2, the position coordinate is (60,50), and the detection time is 105 milliseconds is stored in the storage unit 112. Since a touched point having the same ID has already been detected, there is no change in the number of touched points, which remains two points. Further, as operation information, information that the movement distance from touched point B4 to touched point B5 is 60−50=10 dots, the movement direction is 90°, and the distance between touched point A6 and touched point B5 is 100 dots is acquired and stored. At this stage, the identification unit 115 identifies that the touch state is a "multi-touch state". Further, since the movement direction of the touched point B5 and the movement direction of the touched point A6 are the same, and the movement distance at the touched point B5 is 10 dots, which is equal to or more than the threshold, the recognition unit 116 recognizes a multi-drag operation. Since the multi-drag operation is input in the right direction in a state in which the whole image is displayed on the display 108, the display control unit 117 scrolls the image, and generates and outputs a display image for displaying the image stored ten images before.

Thereafter, each time the touch event "TOUCH" of the touched points A7 and B6 is notified, a multi-drag operation is similarly recognized.

The above is a description of Operation Example 4, in which during a multi-drag operation performed by the user touching with two fingers and moving them horizontally, one point is released, and then the multi-drag operation is continued. Thus, in the present exemplary embodiment, when a situation occurs in which one touched point is not detected while a multi-touch operation is being performed, recognition processing based on a result obtained by determining whether "transition condition 2" is satisfied is performed. Therefore, malfunctions that recognize an unintended single-touch operation can be reduced.

Operation Example 5

Figure 12:
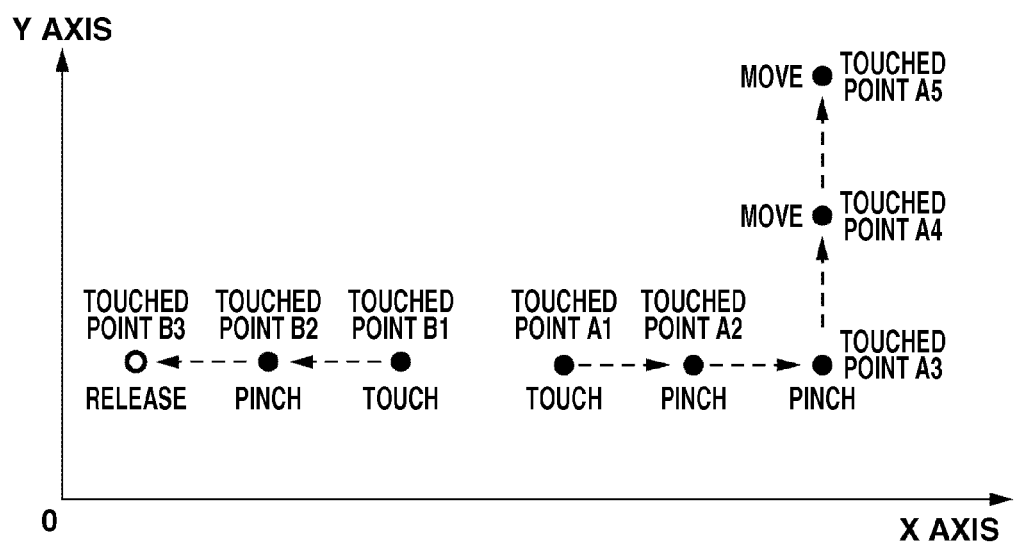
FIG. 12 illustrates an example of shifts in the position of a touched point during a touch operation.

FIG. 12 illustrates an example of shifts in the positions of touched points acquired by the information processing apparatus 100 in Operation Example 5, in which after the user has performed a pinch operation by touching with two fingers and spreading them apart, the user then performs a move operation. Touched points A1 to A5 and touched points B1 to B3 represent the coordinates of the positions touched by the user's fingers on the operation face 901. The X axis represents the horizontal axis and the Y axis represents the vertical axis. The position first touched by the user's finger 902 on the operation face 901 is touched point A1. Next, the user horizontally moves his/her finger 902 so that touched points move until A2 to A5. Further, the position touched by the user's another finger 903 on the operation face 901 is touched point B1. Similarly, the user horizontally moves his/her finger 903 so that the touched point moves to B2, and releases his/her finger 903 from the touch panel at touched point B3.

Based on this series of operations, operation of the information processing apparatus 100 according to the present exemplary embodiment will be described.

First, the touch event "TOUCH" of the touched point A1 is notified from the touch panel. The detection unit 111 stores information regarding touched point A1 that the ID is 1, the position coordinate is (60,100), and the detection time is zero milliseconds. Further, the touched point number acquisition unit 114 acquires the number of touched points from the number of IDs, and stores the history that the number of touched points has changed from zero point to one point. In addition, since this is the first detected touched point, the operation information acquisition unit 113 acquires the movement distance of zero dot. The identification unit 115 refers to the touch information, and determines that since the number of touched points is one and the number of touched points is currently changed from zero point to one point, transition condition 1 is not satisfied. Accordingly, the identification unit 115 identifies that the touch state is a "0 to 1 transition state". At this stage, since the touch state is a "0 to 1 transition state", the recognition unit 116 finishes the processing without performing identification processing. Since there is no recognized touch operation, the display content is not changed.

Next, the touch event "TOUCH" of the touched point B1 is notified from the touch panel. The detection unit 111 stores information regarding touched point B1 that the ID is 2, the position coordinate is (40,100), and the detection time is five milliseconds. Further, the touched point number acquisition unit 114 acquires the fact that the number of touched points is two from the number of IDs. In addition, since this touched point of the ID 2 is detected for the first time, the operation information acquisition unit 113 acquires the information that the movement distance is zero dot. Still further, the operation information acquisition unit 113 acquires and stores information that the distance between touched point A1 and touched point B1 is 20 dots. At this stage, since the number of touched points is two, the identification unit 115 identifies that the touch state of a "multi-touch state". Therefore, the recognition unit 116 performs multi-touch operation recognition. However, at this stage, since the acquired operation information does not satisfy the recognition condition for either a multi-drag operation or a pinch operation, an operation is not recognized. The recognition conditions for each of these operations are the same as in Operation Example 2. Since there is no recognized touch operation, the display content is not changed.

Next, the touch event "TOUCH" of the touched point A2 is notified from the touch panel. The detection unit 111 stores information regarding touched point A2 that the ID is 1, the position coordinate is (70,100), and the detection time is 20 milliseconds. Since a touched point having the same ID has already been detected, there is no change in the number of touched points, which remains two points. Further, the operation information acquisition unit 113 acquires and stores information that the movement distance from touched point A1 to touched point A2 is 10 dots, the movement direction is 90°, and the distance between touched point A2 and touched point B1 is 30 dots. Since the number of touched points is two, the identification unit 115 continues identifying that the touch state is a "multi-touch state". At this stage, since the movement direction of the two touched points is different, and the amount of change in the distance between the two points is 20−10=10 dots, the pinch operation recognition condition is satisfied. Therefore, the recognition unit 116 recognizes a pinch operation. Since the pinch operation is input in a state in which the whole image is displayed on the display, the display control unit 117 enlarges the displayed image, and generates and outputs a display image for displaying a part of the enlarged image.

Next, the touch event "TOUCH" of the touched point B2 is notified from the touch panel. The detection unit 111 stores information regarding touched point B2 that the ID is 2, the position coordinate is (30,100), and the detection time is 25 milliseconds. Since a touched point having the same ID has already been detected, there is no change in the number of touched points, which remains two points. Further, the operation information acquisition unit 113 acquires and stores information that the movement distance from touched point B1 to touched point B2 is 10 dots, the movement direction is 270°, and the distance between touched point A2 and touched point B2 is 40 dots. Since the number of touched points is two, the identification unit 115 continues identifying that the touch state is a "multi-touch state". At this stage, since the movement direction of the two touched points is different, and the amount of change in the distance between the two points is 40−30=10 dots, the pinch operation recognition condition is satisfied. Therefore, the recognition unit 116 recognizes a pinch operation. Since the pinch operation is input in a state in which the whole image is displayed on the display, the display control unit 117 enlarges the displayed image, and generates and outputs a display image for displaying a part of the enlarged image.

Next, the touch event "TOUCH" of the touched point A3 is notified from the touch panel. The detection unit 111 stores information regarding touched point A3 that the ID is 1, the position coordinate is (80,100), and the detection time is 40 milliseconds. Since a touched point having the same ID has already been detected, there is no change in the number of touched points, which remains two points. Further, the operation information acquisition unit 113 acquires and stores information that the movement distance from touched point A2 to touched point A3 is 10 dots, the movement direction is 90°, and the distance between touched point A3 and touched point B2 is 50 dots. Since the number of touched points is two, the identification unit 115 continues identifying that the touch state is a "multi-touch state". At this stage, since the movement direction of the two touched points is different, and the amount of change in the distance between the two points is 50−40=10 dots, the pinch operation recognition condition is satisfied. Therefore, the recognition unit 116 recognizes a pinch operation. Since the pinch operation is input in a state in which the whole image is displayed on the display, the display control unit 117 enlarges the displayed image, and generates and outputs a display image for displaying a part of the enlarged image.

Next, the touch event "RELEASE" of the touched point B3 is notified from the touch panel, and the fact that the user has released his/her touch of the touched point of the ID 2 is detected by the detection unit 111. Then, the detection unit 111 deletes the information relating to the touched point of the ID 2 from the information stored in the storage unit 112. Since the number of touched points has decreased from two points to one point, and transition condition 2 is not satisfied, the identification unit 115 identifies that the touch state is a "2 to 1 transition state". Since the touch state is a "2 to 1 transition state", the recognition unit 116 does not recognize a touch operation. Since there is no recognized touch operation, the display control unit 117 does not change the display content.

Next, the touch event "TOUCH" of the touched point A4 is notified from the touch panel, and the detection unit 111 stores information regarding touched point A4 that the ID is 1, the position coordinate is (80,110), and the detection time is 60 milliseconds. Since a touched point having the same ID has already been detected, there is no change in the number of touched points, which remains at one point. The operation information acquisition unit 113 acquires and stores information that the movement distance from touched point A3 to touched point A4 is 10 dots and the movement direction is 0°. At this stage, the identification unit 115 is in a state in which the history that the number of touched points has changed from two points to one point is stored. Further, since the movement direction is 45° or more different from the previous operation when the touched point (A3) with the ID 1 is detected, transition condition 2 is satisfied. Therefore, the identification unit 115 identifies that the touch state is a "single-touch state", and deletes the stored change history of the number of touched points. Therefore, the recognition unit 116 compares the acquired operation information with the recognition condition for a single-touch operation. In the present exemplary embodiment, since the touched point (A4) of the ID 1 has moved 10 dots in the Y axis direction, the move operation recognition condition is satisfied. Therefore, the recognition unit 116 recognizes a move operation. Since the move operation is input in an upward direction in a state in which the whole image is displayed on the display, the display control unit 117 outputs a display image for moving the displayed position of the image downward.

Thereafter, each time the touch event "TOUCH" of the touched points A5 is notified, a move operation is similarly recognized.

The above is a description of Operation Example 5, in which after the user has performed a pinch operation by widening the interval between two fingers, the user then performs a move operation. Thus, in the present exemplary embodiment, when the number of touched points decreases to one point after a multi-touch operation has been performed, recognition processing based on a result obtained by determining whether "transition condition 2" is satisfied is performed.

Although Operation Examples 1 to 5 are described based on examples in which the single-touch operation is a move operation, the present invention is not limited to this. For example, the present invention can be similarly applied even in a flick operation in which a finger is moved so as to gently bounce off the screen. Further, although the multi-touch operation is described based on a multi-drag or a pinch operation as an example, the present invention can be similarly applied even in a rotate operation.

According to the present invention, malfunctions in an apparatus capable of a multi-touch operation caused by changes in the detected touched points can be reduced.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-161542 filed Jul. 20, 2012, which is hereby incorporated by reference herein in its entirety.

What is claimed is:

1. An information processing apparatus configured to recognize a single-touch operation and a multi-touch operation based on one or more touch points detected on an operation screen, the information processing apparatus comprising:
a detection unit configured to detect each of the one or more touched points on the operation screen;
an identification unit configured to determine whether a number of touched points being detected by the detection unit has decreased to one point, or whether the number of touched points being detected by the detection unit has increased to one point; and
a recognition unit configured to, in a case where the identification unit determines that the number of touched points being detected by the detection unit has increased to one point, recognize a single-touch state based on that the one touched point detected by the detection unit has satisfied a first threshold condition, and in a case where the identification unit determines that the number of touched points being detected by the detection unit has decreased to one point, recognize the single-touch state based on one touched point detected by the detection unit has satisfied a second threshold condition different from the first threshold condition,
wherein the recognition unit is further configured to, depending on the single-touch state having been recognized, compare input information about the one touched point with a pre-stored condition for a predetermined single-touch operation, and recognize a single-touch operation corresponding to the pre-stored condition that is satisfied by the input information, as a single-touch operation input to the information processing apparatus,
wherein the pre-stored condition is same regardless of whether the single-touch state has been recognized based on that the first threshold condition has been satisfied or the single-touch state has been recognized based on that the second threshold condition has been satisfied, and
wherein the recognition unit is configured not to recognize the single-touch state during a period in which the first threshold condition has not been satisfied after the number of touched points has increased to one point, and during a period in which the second threshold condition different from the first threshold condition has not been satisfied after the number of touched points has decreased to one point.

2. The information processing apparatus according to claim 1, wherein at least one of the first threshold condition and the second threshold condition is a condition that a length of time that has elapsed since the number of touched points being detected by the detection unit changed to one point is more than a threshold value.

3. The information processing apparatus according to claim 1, wherein at least one of the first threshold condition and the second threshold condition is a condition that an amount of distance that the one touched point has moved since the number of touched points being detected by the detection unit changed to one point is more than a threshold value.

4. The information processing apparatus according to claim 1, wherein at least one of the first threshold condition and the second threshold condition is a condition that a time that the single-touch state has been detected by the recognition unit since the number of touched points being detected by the detection unit changed to one point, is more than a threshold value.

5. The information processing apparatus according to claim 1, wherein the second threshold condition is a condition that an angle representing a difference in direction that a touched point detected by the detection unit has moved before and after the number of touched points being detected by the detection unit changed to one point is equal to or more than a threshold value.

6. The information processing apparatus according to claim 1, wherein the detection unit is configured to detect each of the one or more touched points by acquiring information indicating a position touched on a touch-sensitive panel.

7. The information processing apparatus according to claim 1, wherein the recognition unit is configured to, in a case where the number of touched points being detected by the detection unit has decreased to one point from the number of touched points being detected most recently, not recognize information relating to the one touched point as an instruction for a single-touch operation.

8. The information processing apparatus according to claim 1, wherein the recognition unit is configured to, in a case where the number of touched points being detected by the detection unit has changed to one point from a state in which a touched point is not detected by the detection unit, recognize information relating to the one touched point as an instruction for a single-touch operation.

9. The information processing apparatus according to claim 1, wherein the information processing apparatus is capable of executing a single-touch operation, a first multi-touch operation based on two touched points, and a second multi-touch operation based on three or more touched points,
wherein the identification unit is further configured to determine whether the number of touched points being detected by the detection unit increased to two touched points from a previous number of touched points, or whether the number of touched points being detected by the detection unit has decreased to two points,
wherein the recognition unit is further configured to, in a case where the identification unit determines that the number of touched points being detected by the detection unit has increased to two points, recognize a multi-touch state based on that the two touched points being detected by the detection unit have satisfied a third threshold condition, and in a case where the identification unit determines that the number of touched points being detected by the detection unit has decreased to two points, recognize the multi-touch state based on that the two touched points detected by the detection unit have satisfied a fourth threshold condition different from the third threshold condition, and
wherein the recognition unit compares input information about the two touched points with a pre-stored condition for a predetermined multi-touch operation, depending on the multi-touch state having been recognized, and recognizes a multi-touch operation corresponding to the pre-stored condition that is satisfied by the input information, as a multi-touch operation input to the information processing apparatus, and configured not to recognize the first multi-touch operation during a period in which a predetermined condition has not been satisfied after the number of touched points has increased to two points, and a period after the number of touched points has decreased to two points and in which a predetermined condition has not been satisfied.

10. The information processing apparatus according to claim 9, wherein the fourth threshold condition is set so as to be stricter than the third threshold condition.

11. The information processing apparatus according to claim 1, wherein the second threshold condition is set so as to be stricter than the first threshold condition.

12. The information processing apparatus according to claim 1, wherein the pre-stored condition includes a scrolling operation that is a movement distance of the one touched point detected on the operation screen that exceeds a same threshold regardless of whether the single-touch state has been recognized based on that the first threshold condition has been satisfied or the single-touch state has been recognized based on that the second threshold condition has been satisfied.

13. The information processing apparatus according to claim 1, wherein a time until the second threshold condition has been satisfied after the number of touched points has decreased to one point is longer than a time until the first threshold condition has been satisfied after the number of touched points has increased to one point.

14. A non-transitory computer-readable storage medium that stores a program which causes a computer to function as each unit in an information processing apparatus configured to recognize a single-touch operation and a multi-touch operation based on one or more touch points detected on an operation screen, the information processing apparatus comprising:
a detection unit configured to detect each of the one or more touched points on the operation screen;
an identification unit configured to determine whether a number of touched points being detected by the detection unit has decreased to one point, or whether the number of touched points being detected by the detection unit has increased to one point; and
a recognition unit configured to, in a case where the identification unit determines that the number of touched points being detected by the detection unit has increased to one point, recognize a single-touch state based on the one touched point detected by the detection unit has satisfied a first threshold condition, and in a case where the identification unit determines that the number of touched points being detected by the detection unit has decreased to one point, recognize the single-touch state based on one touched point detected by the detection unit has satisfied a second threshold condition different from the first threshold condition,
wherein the recognition unit is further configured to, depending on the single-touch state having been recognized, compare input information about the one touched point with a pre-stored condition for a predetermined single-touch operation, and recognize a single-touch operation corresponding to the pre-stored condition that is satisfied by the input information, as a single-touch operation input to the information processing apparatus,
wherein the pre-stored condition is same regardless of whether the single-touch state has been recognized based on that the first threshold condition has been satisfied or the single-touch state has been recognized based on that the second threshold condition has been satisfied, and
wherein the recognition unit is configured not to recognize the single-touch state during a period in which the first threshold condition has not been satisfied after the number of touched points has increased to one point, and during a period in which the second threshold condition different from the first threshold condition has not been satisfied after the number of touched points has decreased to one point.

15. A method for controlling an information processing apparatus configured to recognize a single-touch operation and a multi-touch operation based on one or more touch points detected on an operation screen, the method comprising:
   detecting each of the one or more touched points on the operation screen;
   determining whether a number of touched points being detected has decreased to one point, or whether the number of touched points being detected has increased to one point; and
   in a case where the determining determines that the number of touched points being detected by the detecting has increased to one point, recognizing a single-touch state based on the one touched point detected by the detecting has satisfied a first threshold condition, and in a case where the determining determines that the number of touched points being detected has decreased to one point, recognizing the single touch state based on one touched point detected in the detecting has satisfied a second threshold condition different from the first threshold condition, and
   depending on the single-touch state having been recognized, comparing input information about the one touched point with a pre-stored condition for a predetermined single-touch operation, and recognizing a single-touch operation corresponding to the pre-stored condition that is satisfied by the input information, as a single-touch operation input to the information processing apparatus,
   wherein the pre-stored condition is same regardless of whether the single-touch state has been recognized based on that the first threshold condition has been satisfied or the single-touch state has been recognized based on that the second threshold condition has been satisfied, and
   not recognizing the single-touch state during a period in which the first threshold condition has not been satisfied after the number of touched points has increased to one point, and during a period in which the second threshold condition different from the first threshold condition has not been satisfied after the number of touched points has decreased to one point.

16. An information processing apparatus configured to recognize a touch operation based on one or more touch points detected on an operation screen, the information processing apparatus comprising:
   a detection unit configured to detect each of the one or more touched positions on the operation screen;
   an identification unit configured to determine whether a number of touched points being detected by the detection unit has decreased to N, or whether the number of touched points being detected by the detection unit has increased to N; and
   a recognition unit configured to, in a case where the identification unit determines the number of touched positions detected by the detection unit has decreased to N, recognize an N-touched state that is for recognition of a predetermined operation input by N touched points based on that the N touched points detected by the detection unit have satisfied a first threshold condition, and in a case where the identification unit determines the number of touched positions detected by the detection unit has increased to N, recognize the N-touched state based on that the N touched points detected by the detection unit have satisfied a second threshold condition that is different from the first threshold condition,
   wherein the recognition unit is further configured to, depending on the N-touch state having been recognized, compare input information about the N touched points with a pre-stored condition for a predetermined touch operation, and recognize a touch operation corresponding to the pre-stored condition that is satisfied by the input information, as a touch operation input to the information processing apparatus, and
   wherein the recognition unit is configured not to recognize the touch operation during a period in which the first threshold condition has not been satisfied after the number of touched points has decreased to N, and a period in which the second threshold condition different from the first threshold condition has not been satisfied after the number of touched points has increased to N.

17. The information processing apparatus according to claim 16, wherein the second threshold condition is set so as to be stricter than the first threshold condition.

18. An information processing apparatus configured to recognize a single-touch operation and a multi-touch operation based on one or more touch points detected on an operation screen, the information processing apparatus comprising:
   a detection unit configured to detect each of the one or more touched points on the operation screen;
   a recognition unit configured to recognize a predetermined single-touch operation corresponding to a pre-stored condition that is satisfied by input information about one touched point detected by the detection unit, as a single-touch operation input to the information processing apparatus, and
   an identification unit configured to determine whether a number of touched points being detected by the detection unit has decreased to one point, or whether the number of touched points being detected by the detection unit has increased to one point;
   wherein the recognition unit, in a case where the identification unit determines that the number of touched points being detected by the detection unit has increased to one point, does not recognize the predetermined single-touch operation until a first threshold condition has been satisfied by the one touched point detected by the detection unit after the number of touched points has increased to one point, and in a case where the identification unit determines that the number of touched points being detected by the detection unit has decreased to one point, does not recognize the predetermined single-touch operation until a second threshold condition different from the first threshold condition has been satisfied by the one touched point detected by the detection unit after the number of touched points has decreased to one point, and
   wherein a time period until the second threshold condition has been satisfied after the number of touched points has decreased to one point is longer than a time period until the first threshold condition has been satisfied after the number of touched points has increased to one point.

19. A non-transitory computer-readable storage medium that stores a program which causes a computer to function as each unit in an information processing apparatus configured to recognize a single-touch operation and a multi-touch operation based on one or more touch points detected on an operation screen, the information processing apparatus comprising:
- a detection unit configured to detect each of the one or more touched points on the operation screen;
- a recognition unit configured to recognize a predetermined single-touch operation corresponding to a pre-stored condition that is satisfied by input information about one touched point detected by the detection unit, as a single-touch operation input to the information processing apparatus, and
- an identification unit configured to determine whether a number of touched points being detected by the detection unit has decreased to one point, or whether the number of touched points being detected by the detection unit has increased to one point;
- wherein the recognition unit, in a case where the identification unit determines that the number of touched points being detected by the detection unit has increased to one point, does not recognize the predetermined single-touch operation until a first threshold condition has been satisfied by the one touched point detected by the detection unit after the number of touched points has increased to one point, and in a case where the identification unit determines that the number of touched points being detected by the detection unit has decreased to one point, does not recognize the predetermined single-touch operation until a second threshold condition different from the first condition has been satisfied by the one touched point detected by the detection unit after the number of touched points has decreased to one point, and
- wherein a time period until the second threshold condition has been satisfied after the number of touched points has decreased to one point is longer than a time period until the first threshold condition has been satisfied after the number of touched points has increased to one point.

20. A method for controlling an information processing apparatus configured to recognize a single-touch operation and a multi-touch operation based on one or more touch points detected on an operation screen, the method comprising:
- detecting each of the one or more touched points on the operation screen;
- recognizing a predetermined single-touch operation corresponding to a pre-stored condition that is satisfied by input information about one touched point being detected, as a single-touch operation input to the information processing apparatus;
- determining whether a number of detected touched points has decreased to one point, or whether the number of touched points being detected has increased to one point; and
- in a case where the determining determines that the number of touched points being detected by the detecting has increased to one point, not recognizing the predetermined single-touch operation until a first threshold condition has been satisfied by the one touched point detected by the detecting after the number of touched points has increased to one point, and in a case where the determining determines that the number of touched points being detected by the detecting has decreased to one point, not recognizing the predetermined single-touch operation until a second threshold condition different from the first threshold condition has been satisfied by the one touched point detected by the detecting after the number of touched points has decreased to one point,
- wherein a time period until the second threshold condition has been satisfied after the number of touched points has decreased to one point is longer than a time period until the first threshold condition has been satisfied after the number of touched points has increased to one point.

* * * * *